(12) United States Patent
Hendry et al.

(10) Patent No.: US 10,349,067 B2
(45) Date of Patent: Jul. 9, 2019

(54) HANDLING OF END OF BITSTREAM NAL UNITS IN L-HEVC FILE FORMAT AND IMPROVEMENTS TO HEVC AND L-HEVC TILE TRACKS

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 136 days.

(21) Appl. No.: 15/432,855

(22) Filed: Feb. 14, 2017

(65) Prior Publication Data

US 2017/0237999 A1  Aug. 17, 2017

Related U.S. Application Data

(60) Provisional application No. 62/296,569, filed on Feb. 17, 2016.

(51) Int. Cl.
| | | |
|---|---|---|
| *H04N 19/39* | (2014.01) | |
| *H04N 19/70* | (2014.01) | |
| *H04N 19/30* | (2014.01) | |
| *H04N 19/184* | (2014.01) | |

(52) U.S. Cl.
CPC .......... *H04N 19/39* (2014.11); *H04N 19/30* (2014.11); *H04N 19/70* (2014.11); *H04N 19/184* (2014.11)

(58) Field of Classification Search
CPC ......... H04N 19/39; H04N 19/70; H04N 19/30
See application file for complete search history.

(56) References Cited

U.S. PATENT DOCUMENTS

| | | | | |
|---|---|---|---|---|
| RE44,923 E | * | 6/2014 | Xu | ................................ 341/107 |
| 9,154,785 B2 | * | 10/2015 | Wang | ..................... H04N 19/70 |
| 2008/0013620 A1 | * | 1/2008 | Hannuksela | ......... H04N 19/597 |
| | | | | 375/240.01 |

(Continued)

OTHER PUBLICATIONS

Hannuksela M.M., "MV-HEVC/SHVC HLS: On Additional Layer Sets, Rewriting of Simulcast Layers, and Profile-Tier-Level Indication for Auxiliary Picture Layers", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0078-v4, Apr. 4, 2014 (Apr. 4, 2014), pp. 1-7, XP030115980, the whole document.

(Continued)

*Primary Examiner* — Neil R Mikeska
(74) *Attorney, Agent, or Firm* — Kilpatrick Townsend & Stockton, LLP

(57) ABSTRACT

In various implementations, techniques are described herein to resolve issues related to the location of an EOB NAL unit in an ISO base media file. In various implementations, these techniques include relaxing the requirement that a file include only one EOB NAL unit. These techniques further include providing the EOB NAL unit from the highest layer when reconstructing the bitstream. This EOB NAL unit can be added to a last access unit in the reconstructed bitstream. When the EOB NAL unit from the highest layer is not present, an EOB NAL unit from a lower layer can be provided instead.

32 Claims, 17 Drawing Sheets

(56) References Cited

U.S. PATENT DOCUMENTS

| | | | |
|---|---|---|---|
| 2014/0092986 A1* | 4/2014 | Chou | H04N 19/15 375/240.25 |
| 2015/0271526 A1* | 9/2015 | Hendry | H04N 19/124 375/240.26 |
| 2016/0100196 A1* | 4/2016 | Wu | H04N 19/70 375/240.02 |
| 2017/0094288 A1* | 3/2017 | Hannuksela | H04N 19/105 |

OTHER PUBLICATIONS

Hendry et al., "Comments on ISO/IEC 14496-15," 114, MPEG Meeting; Feb. 22, 2016-Feb. 26, 2016; San Diego; (Motion Picture Expert Group or ISO/IEC JTC1/SC29/WG11),, No. m37915, Feb. 18, 2016 (Feb. 18, 2016), XP030066281, 4 pages.

International Search Report and Written Opinion—PCT/US2017/017979—ISA/EPO—dated Apr. 26, 2017.

Rodriguez A A., et al., "Prop SEI Message to Forewarn Location of End of Stream," 26, JVT Meeting; 83, MPEG Meeting; Jan. 13, 2008-Jan. 18, 2008; Antalya, ;(Joint Video Team of ISO/IEC JTC1/SC29/WG11 and ITU-T SG.16 ),. No. JVT-Z042, Jan. 9, 2008 (Jan. 9, 2008), XP030007331, ISSN: 0000-0136, 5 pages.

"Text of ISO/IEC DIS 14496-15 4th edition," 112, MPEG Meeting;Jun. 22, 2015-Jun. 26, 2015; Warsaw; (Motion Picture Expert Group or ISO/IEC JTC1/SC29/WG11),, No. N15479, Aug. 26, 2015 (Aug. 26, 2015), XP030022193, 86 pages.

"Study of ISO/IEC DIS 14496-15 4th Edition", 113, MPEG Meeting, Oct. 19, 2015-Oct. 23, 2015; Geneva; (Motion Picture Expert Group or ISO/IEC JTC1/SC29/WG11), No. N15640, Dec. 7, 2015, 172 pages, XP030022328.

\* cited by examiner

HANDLING OF END OF BITSTREAM NAL UNITS IN L-HEVC FILE FORMAT AND IMPROVEMENTS TO HEVC AND L-HEVC TILE TRACKS

CROSS-REFERENCES TO RELATED APPLICATIONS

This application claims the benefit under 35 U.S.C. § 119 of Provisional Patent Application No. 62/296,569, filed on Feb. 17, 2016, the entirety of which is incorporated herein.

FIELD

This application is related to handling of end of bitstream (EOB) Network Abstraction Layer (NAL) units when a layered High Efficiency Video Coding (L-HEVC, also referred to as LHEVC) bitstream is stored in (e.g., written to) a file. Further, this application also describes improvements to HEVC and L-HEVC tile tracks, including, among others, a method for avoiding circular referencing in HEVC and L-HEVC tile tracks and methods for signaling the relative position of a tile track to the corresponding track containing the video of complete pictures.

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multi-view extension (i.e., multi-view high efficiency video coding, MV-HEVC).

BRIEF SUMMARY

In some embodiments, techniques are described for providing an end of bitstream (EOB) Network Access Layer (NAL) unit when a layered High Efficiency Video Coding (L-HEVC) is written to a file, as well as for reading such a file.

According to at least one example, a method for processing encoded video data is provided that includes receiving a file associated with encoded video data. The encoded video data can be stored in the file according to a file format. The encoded video data can include two or more layers. The two or more layers can be stored in two or more tracks in the file. The method further includes determining a first layer from among the two or more layers. The first layer can be determined to be a highest layer among the two or more layers that includes an end-of-bitstream indicator. The method further includes determining a first end-of bitstream indicator. The first end-of-bitstream indicator can be the end-of-bitstream indicator from the first layer. The method further includes selecting a set of layers from among the two or more layers. The method further includes generating a series of access units. The series of access units can include samples from the set of layers. The method further includes generating a reconstructed bitstream using the series of access units and the first end-of-bitstream indicator. A last access unit in the reconstructed bitstream can include the first end-of-bitstream indicator.

In another example, an apparatus is provided that includes a memory configured to store video data and a processor. The processor is configured to and can receive a file associated with encoded video data. The encoded video data can be stored in the file according to a file format. The encoded video data can include two or more layers. The two or more layers can be stored in two or more tracks in the file. The processor is configured to and can determine a first layer from among the two or more layers. The first layer can be determined to be a highest layer among the two or more layers that includes an end-of-bitstream indicator. The processor is configured to and can determine a first end-of bitstream indicator. The first end-of-bitstream indicator can be the end-of-bitstream indicator from the first layer. The processor is configured to and can select a set of layers from among the two or more layers. The processor is configured to and can generate a series of access units. The series of access units can include samples from the set of layers. The processor is configured to and can generate a reconstructed bitstream using the series of access units and the first end-of-bitstream indicator. A last access unit in the reconstructed bitstream can include the first end-of-bitstream indicator.

In another example, a computer readable medium is provided having stored thereon instructions that, when executed by a processor, perform a method that includes: receiving a file associated with encoded video data. The encoded video data can be stored in the file according to a file format. The encoded video data can include two or more layers. The two or more layers can be stored in two or more tracks in the file. The method further includes determining a first layer from among the two or more layers. The first layer can be determined to be a highest layer among the two or more layers that includes an end-of-bitstream indicator. The method further includes determining a first end-of bitstream indicator. The first end-of-bitstream indicator can be the end-of-bitstream indicator from the first layer. The method further includes selecting a set of layers from among the two or more layers. The method further includes generating a series of access units. The series of access units can include samples from the set of layers. The method further includes generating a reconstructed bitstream using the series of access units and the first end-of-bitstream indicator. A last access unit in the reconstructed bitstream can include the first end-of-bitstream indicator.

In another example, an apparatus is provided that includes means for receiving a file associated with encoded video data. The encoded video data can be stored in the file according to a file format. The encoded video data can include two or more layers. The two or more layers can be stored in two or more tracks in the file. The apparatus further comprises a means for determining a first layer from among the two or more layers. The first layer can be determined to be a highest layer among the two or more layers that includes an end-of-bitstream indicator. The apparatus further comprises a means for determining a first end-of bitstream indicator. The first end-of-bitstream indicator can be the end-of-bitstream indicator from the first layer. The apparatus further includes a means for selecting a set of layers from among the two or more layers. The apparatus further includes a means for generating a series of access units. The series of access units can include samples from the set of layers. The apparatus further includes a means for generating a reconstructed bitstream using the series of access units and the first end-of-bitstream indicator. A last access unit in the reconstructed bitstream can include the first end-of-bitstream indicator.

In some aspects, the methods, apparatuses, and computer readable medium described above further comprise determining that a last access unit from the series of access units does not include an end-of-bitstream indicator. These aspects further include adding the first end-of-bitstream indicator to a last access unit in the series of access units.

In some aspects, the methods, apparatuses, and computer readable medium described above further comprise identifying a second layer from among the set of layers, wherein the second layer is identified as a highest layer from among the set of layers. These aspects further include determining that the first layer is a higher layer than the second layer. These aspects further include adding the first end-of-bitstream indicator to a last access unit in the series of access units.

In some aspects, the methods, apparatuses, and computer readable medium described above further comprise identifying a second layer form among the set of layers, wherein the second layer is identified as a highest layer from among the set of layers. These aspects further include determining that the second layer is a higher layer than the first layer. These aspects further include moving the first end-of-bitstream indicator to a last access unit in the series of access units.

In some aspects, the methods, apparatuses, and computer readable medium described above further comprise determining that the last access unit in the reconstructed bitstream includes more than one end-of-bitstream indicators. In these aspects, the more than one end-of-bitstream indicators include the first end-of-bitstream indicator. These aspects further include removing from the last access unit all of the more than one end-of-bitstream indicators other than the first end-of-bitstream indicator.

In some aspects, the at least two layers from among the two or more layers include an end-of-bitstream indicator. In some aspects the set of layers are selected based on the samples from layers in the set of layers being selected for display. In some aspects, the file format is derived form an ISO base media file format.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
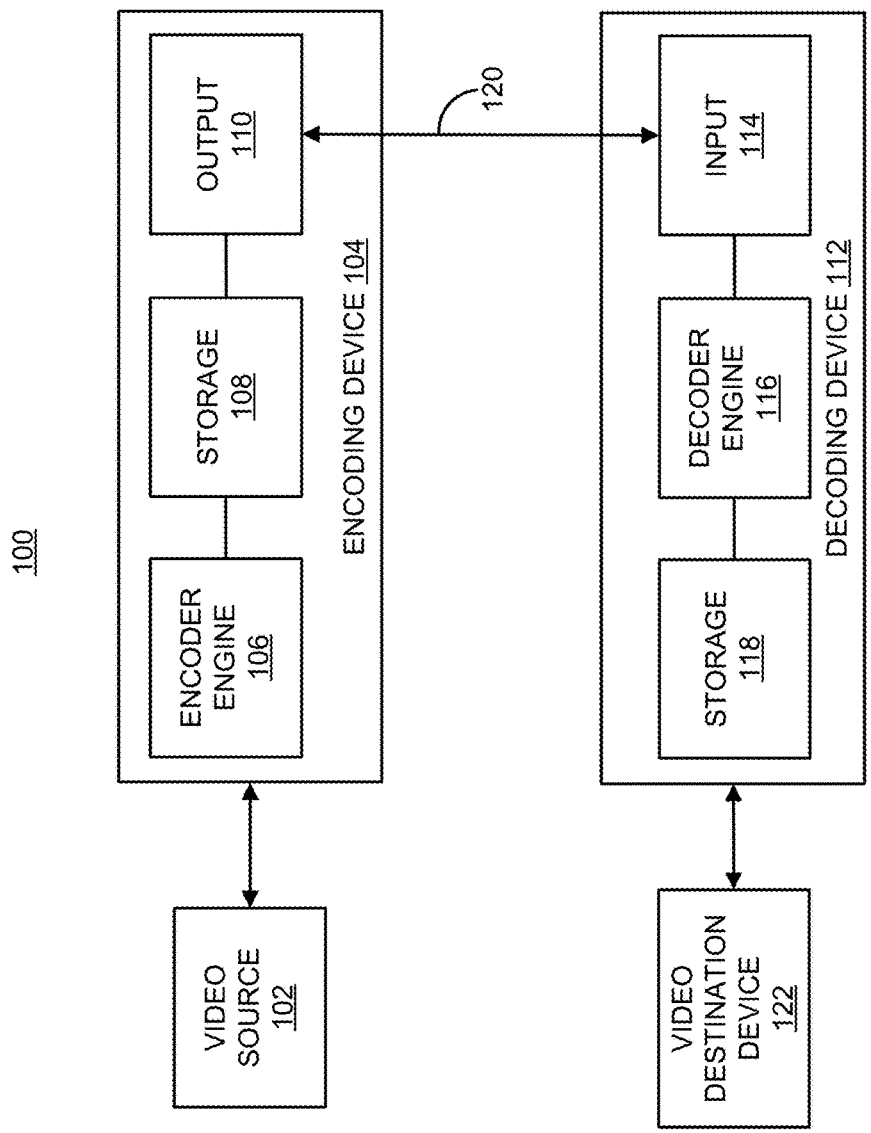
FIG. 1 is a block diagram illustrating an example of a system including an encoding device and a decoding device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of this disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

File format standards can define the format for packing and unpacking video (and possibly also audio) data into one or more files. File format standards include International Organization for Standardization (ISO) base media file format (ISOBMFF, defined in ISO/IEC 14496-12) and other file formats derived from the ISOBMFF, including Motion Pictures Experts Group (MPEG) MPEG-4 file format (defined in ISO/IEC 14496-15), 3rd Generation Partnership Project (3GPP) file format (defined in 3GPP TS 26.244) and Advanced Video Coding (AVC) file format (defined in ISO/IEC 14496-15). The draft texts of recent new editions for ISO/IEC 14496-12 and 14496-15 are available at http://phenix.int-evry.fr/mpeg/doc_end_user_documents/111_Geneva/wg11/w15177-v6-w15177.zip and http://phenix.int-evey.fr/mpeg/doc_end_user/documents/112_Warsaw/wg11/w15479-v2-w15479.zip, respectively.

The ISOBMFF is used as the basis for many codec encapsulation formats (e.g., the AVC file format or any other suitable codec encapsulation format), as well as for many multimedia container formats (e.g., the MPEG-4 file format, the 3GPP file format (3GP), the DVB file format, or any other suitable multimedia container format). ISOBMFF-based file formats can be used for continuous media, which is also referred to as streaming media.

In addition to continuous media (e.g., audio and video), static media (e.g., images) and metadata can be stored in a file conforming to ISOBMFF. Files structured according to the ISOBMFF may be used for many purposes, including local media file playback, progressive downloading of a remote file, as segments for Dynamic Adaptive Streaming over HTTP (DASH), as containers for content to be streamed (in which case the containers include packetization instructions), for recording of received real-time media streams, or other uses.

Bitstreams encoded using HEVC or an extension of HEVC generally include and indicator at the end of the bitstream, which can indicate to a decoder that the end of the bitstream has been reached. The indicator can take the form of an end-of-bitstream (EOB) network abstraction layer (NAL) unit.

When the bitstream includes multiple layers, the EOB NAL unit will still be placed at the end of the bitstream, but where the EOB NAL unit is placed when the bitstream is written to a file may vary, and may cause issues for a decoder device. For example, when the EOB NAL unit is in the highest layer and the decoder device reads only the base layer, the EOB NAL unit can be lost. As another example, when the EOB NAL unit is in the base layer and the decoder device is configured to render a higher layer, the EOB NAL unit may be placed in a reconstructed bitstream in a location other than at the end of the reconstructed bitstream. As another example, when the base layer is encoded using a codec other than HEVC (e.g., AVC) and also includes the EOB NAL unit, the EOB NAL unit will have been encoded as a non-HEVC NAL unit. In this example, when the decoder device is configured to render HEVC samples from a higher layer, the decoder device may receive an EOB NAL unit that is not an HEVC NAL unit.

In various implementations, techniques are described herein to resolve issues related to the location (e.g., position) of an EOB NAL unit in an ISO base media file. In various implementations, these techniques include relaxing the requirement that a file include only one EOB NAL unit. These techniques further include providing the EOB NAL unit from the highest layer when reconstructing the bitstream. When the EOB NAL unit from the highest layer is not present, an EOB NAL unit from a lower layer can be provided instead.

Various issues can arise when an ISO base media file includes tile tracks. For example, circular extractor references, duplicated data due to extractors, unnecessary extractors, lack of a specification for reconstructing a bitstream when only the video part of tile track is required, lack of offset information for tile tracks, and other problems may occur. Various solutions to these problems are discussed below.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data, including virtual reality video data, using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its scalable video coding and multiview video coding extensions, known as SVC and MVC, respectively. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Implementations described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 102 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with intra-prediction or inter-prediction. When the inter-prediction applies, the block is only predicted by one reference picture, and therefore reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gate-ways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

Figure 2:
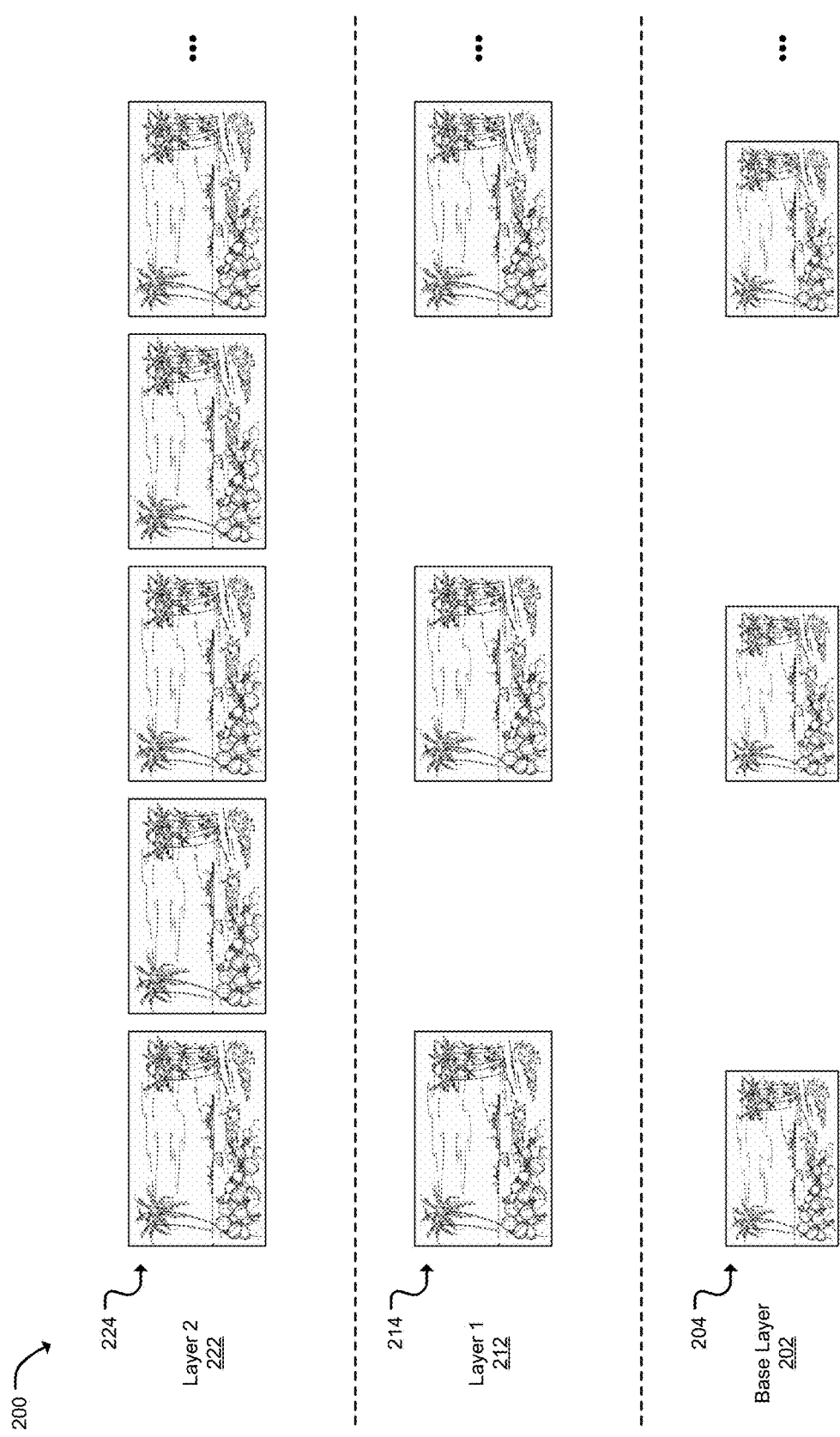
FIG. 2 illustrates a simplified example of a layered HEVC bitstream.

FIG. 2 illustrates a simplified example of a layered HEVC bitstream 200. The bitstream 200 can be an MV-HEVC bitstream and/or an SHVC bitstream. In the illustrated example, the bitstream includes base layer 202 and two enhancement layers, Layer 1 212 and layer 2 214. The base layer 202 can be encoded according to a particular version of HEVC, such as a less-than-current version. Alternatively, the base layer 202 can be encoded using another codec, such as AVC. In these and other examples, encoding the base layer 202 using a codec other than the latest version of HEVC can provide backwards compatibility for decoding devices that do not support the latest version of HEVC, or do not support HEVC (e.g., devices that only support AVC). By adding enhancement layers, an existing bitstream need not be re-encoded for another codec.

In the example of FIG. 2, the first enhancement layer, Layer 1 212, provides the same video as is provided in the base layer 202, but at higher resolution. In some cases, the pictures 214 in Layer 1 212 may be encoded using data from the pictures 204 in the base layer 202. In some cases, the pictures 214 in Layer 1 212 may be independently encoded. A decoding device that supports the higher resolution can thus choose to render the base layer 202 or Layer 1 212. In other examples Layer 1 212 may provide the same pictures 214 as the base layer 202, but using a different codec.

Layer 2 222 is provided in the illustrated example as another example of an enhancement layer. In this example, Layer 2 222 provides the same video as provided in Layer 1 212, but at a higher frame rate. Layer 2 222 thus includes more pictures 224 than are included in Layer 1 212. In some cases, the pictures 224 in Layer 2 222 may be encoded using the pictures 214 in Layer 1 212 and/or the pictures 204 in the base layer 202. In some cases, the pictures 224 in Layer 2 222 may be independently encoded. In some cases, some pictures 224 in Layer 2 222 may be encoded using data from other layers while other pictures 222 are independently encoded.

In examples other than the ones illustrated in FIG. 2, the layers in the bitstream 200 may provide, for example, different views for one video, different videos that can be tiled into one picture, pictures encoded at different bit rates, different frame rates, different resolutions, and so on.

In a bitstream that includes multiple layers, an access unit can include all of the pictures for a particular temporal instance. For example, referring to the example illustrated in FIG. 2, one access unit can include a picture from the base layer 202 and corresponding pictures for the enhancement layers 212, 214, each for the same instant in time as the picture from the base layer 202. In some cases, the access unit may have pictures from only some layers. For example, because the pictures 224 in Layer 2 222 were encoded at a higher frame rate, some pictures 224 from Layer 2 222 may reside in their own access units. In some cases, pictures 204 in the base layer 202 may not have corresponding pictures in the enhancement layers 212, 214, and thus an access unit that includes these pictures 204 may not include any other pictures.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

VCL NAL units include coded picture data forming the coded video bitstream. Various types of VCL NAL units are defined in the HEVC standard. In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra-random access (TRAP) pictures (also referred to as "random access pictures"). In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an TRAP picture at the base layer (the layer ID equal to 0), the AU is an TRAP AU.

HEVC bitstreams can further include an end-of-bitstream (EOB) NAL unit. The EOB NAL unit indicates that the end of a bitstream has been reached. An encoder generally produces the EOB NAL unit, and for HEVC bitstreams the EOB NAL unit is the last NAL unit in the last AU of the bitstream.

A video bitstream encoded as discussed above can be written or packed into one or more files in order to transfer the bitstream from the encoding device 104 to the decoding device 112. For example, the output 110 may include a file writing engine, configured to generate one or more files that contain the bitstream. The output 110 can transmit the one or more files over the communications link 120 to the decoding device 112. Alternatively or additionally, the one or more files can be stored on a storage medium (e.g., a tape, a magnetic disk, or a hard drive, or some other medium) for later transmission to the decoding device 112.

The decoding device 112 can include, for example in the input 114, a file parsing engine. The file parsing engine can read files received over the communications link 120 or from a storage medium. The file parsing engine can further extract samples from the file, and reconstruct the bitstream for decoding by the decoder engine 116. In some cases, the reconstructed bitstream can be the same as the bitstream generated by the encoder engine 106. In some cases, the encoder engine 106 may have generated the bitstream with several possible options for decoding the bitstream, in which case the reconstructed bitstream may include only one or fewer than all the possible options.

Bitstreams encoded as discussed above can be written to a file using the ISOBMFF, a file format derived from the ISOBMFF, some other file format, and/or a combination of file formats including the ISOBMFF. As noted above, when written to a file, a bitstream can be stored and/or transmitted to a decoding device, which can render and display the contents of the bitstream.

Figure 3:
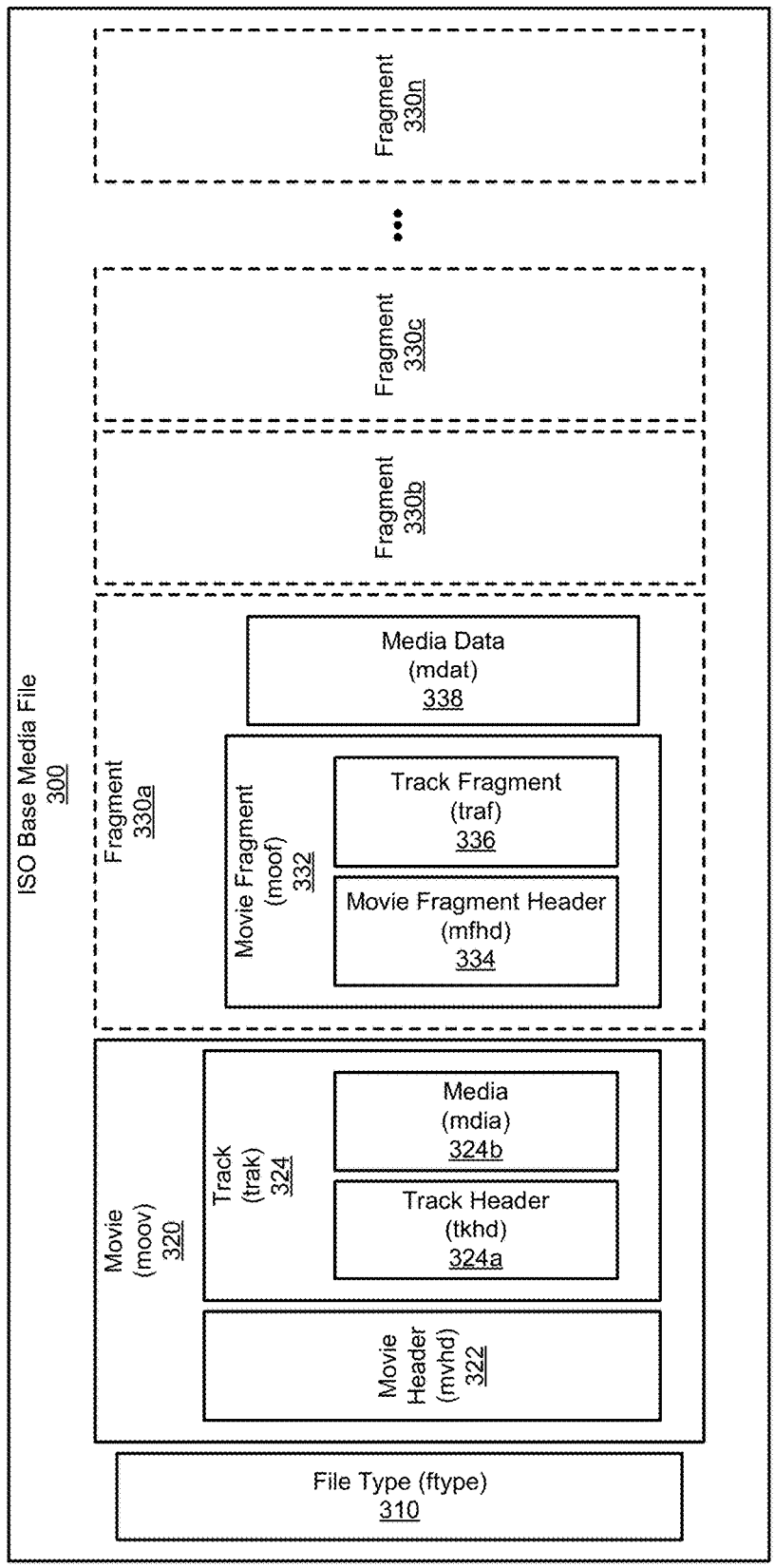
FIG. 3 illustrates an example of an ISO base media file that contains data and metadata for a video presentation, formatted according to the ISOBMFF.

FIG. 3 illustrates an example of an ISO base media file 300 that contains data and metadata for a video presentation, formatted according to the ISOBMFF. The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism.

A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. Boxes generally include a header that provides a size and a type for the box. The size describes the entire size of the box, including the header, fields, and all boxes contained within the box. Boxes with a type that is not recognized by a player device are typically ignored and skipped.

As illustrated by the example of FIG. 3, at the top level of the file, an ISO base media file 300 can include a file type box 310, a movie box 320, and one or more movie fragments 330a, 330n. Other boxes that can be included at this level but that are not represented in this example include free space boxes, metadata boxes, and media data boxes, among others.

An ISO base media file can include a file type box 310, identified by the box type "ftyp." The file type box 310 identifies an ISOBMFF specification that is the most suitable for parsing the file. "Most" in this instance means that the ISO base media file 300 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 310 can also include a version number, which can be used to indicate a version of the ISOBMFF specification. The file type box 310 can also include a list of compatible brands, which includes a list of other brands with which the file is compatible. An ISO base media file can be compatible with more than one major brand.

When an ISO base media file 300 includes a file type box 310, there is only one file type box. An ISO base media file 300 may omit the file type box 310 in order to be compatible with older player devices. When an ISO base media file 300 does not include a file type box 310, a player device can assume a default major brand (e.g. "mp41"), minor version (e.g., "0"), and compatible brand (e.g., "mp41"). The file type box 310 is typically placed as early as possible in the ISO base media file 300.

An ISO base media file can further include a movie box 320, which contains the metadata for the presentation. The movie box 320 is identified by the box type "moov." ISO/IEC 14496-12 provides that a presentation, whether contained in one file or multiple files, can include only one movie box 320. Frequently, the movie box 320 is near the beginning of an ISO base media file. The movie box 320 includes a movie header box 322, and can include one or more track boxes 324 as well as other boxes.

The movie header box 322, identified by the box type "mvhd," can include information that is media-independent and relevant to the presentation as a whole. For example, the movie header box 322 can include information such as a creation time, a modification time, a timescale, and/or a duration for the presentation, among other things. The movie header box 322 can also include an identifier that identifies the next track in the presentation. For example, the identifier can point to the track box 324 contained by the movie box 320 in the illustrated example.

The track box 324, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the illustrated example, the example track box 324 includes a track header box 324a and a media box 324b. A track box can include other boxes, such as a track reference box, a track group box, an edit box, a user data box, a meta box, and others.

The track header box 324a, identified by the box type "tkhd," can specify the characteristics of a track contained in the track box 324. For example, the track header box 324a can include a creation time, modification time, duration, track identifier, layer identifier, group identifier, volume, width, and/or height of the track, among other things. For a media track, the track header box 324a can further identify whether the track is enabled, whether the track should be played as part of the presentation, or whether the track can be used to preview the presentation, among other things. Presentation of a track is generally assumed to be at the beginning of a presentation. The track box 324 can include an edit list box, not illustrated here, that can include an explicit timeline map. The timeline map can specify, among other things, an offset time for the track, where the offset indicates a start time, after the beginning of the presentation, for the track.

In the illustrated example, the track box 324 also includes a media box 324b, identified by the box type "mdia." The media box 324b can contain the objects and information about the media data in the track. For example, the media box 324b can contain a handler reference box, which can identify the media type of the track and the process by which the media in the track is presented. As another example, the media box 324b can contain a media information box, which can specify the characteristics of the media in the track. The media information box can further include a table of samples, where each sample describes a chunk of media data (e.g., video or audio data) including for example the location of the data for the sample. The data for a sample is stored in a media data box, discussed further below. As with most other boxes, the media box 324b can also include a media header box.

In the illustrated example, the example ISO base media file 300 also includes multiple fragments 330a, 330b, 330c, 330n of the presentation. The fragments 330a, 330b, 303c, 330n are not ISOBMFF boxes, but rather describe a movie fragment box 332 and the media data box 338 that is referenced by the movie fragment box 332. The movie fragment box 332 and media data boxes 338 are top-level boxes, but are grouped here to indicate the relationship between a movie fragment box 332 and a media data box 338.

A movie fragment box 332, identified by the box type "moof," can extend a presentation by including additional information that would otherwise be stored in the movie box 320. Using movie fragment boxes 332, a presentation can be built incrementally. A movie fragment box 332 can include a movie fragment header box 334 and a track fragment box 336, as well as other boxes not illustrated here.

The movie fragment header box 334, identified by the box type "mfhd," can include a sequence number. A player device can use the sequence number to verify that the fragment 330a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 332 can also include one or more track fragment boxes 336, identified by the box type "traf" A movie fragment box 332 can include a set of track fragments, zero or more per track. The track fragments can contain zero or more track runs, each of which describes a contiguous run of samples for a track. Track fragments can be used to add empty time to a track, in addition to adding samples to the track.

The media data box 338, identified by the box type "mdat," contains media data. In video tracks, the media data box 338 would contain video frames. A media data box can alternatively or additionally include audio data. A presentation can include zero or more media data boxes, contained in one or more individual files. The media data is described by metadata. In the illustrated example, the media data in the media data box 338 can be described by metadata included in the track fragment box 336. In other examples, the media data in a media data box can be described by metadata in the movie box 320. The metadata can refer to a particular media data by an absolute offset within the file 300, such that a media data header and/or free space within the media data box 338 can be skipped.

Other fragments 330b, 330c, 330n in the ISO base media file 300 can contain boxes similar to those illustrated for the first fragment 330a, and/or can contain other boxes.

The ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 33009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

The ISOBMFF specification specifies six types of Stream Access Points (SAPs) for use with DASH. The first two SAP types (types 1 and 2) correspond to instantaneous decoding refresh (IDR) pictures in H.264/AVC and HEVC. For example, an IDR picture is an intra-picture (I-picture) that completely refreshes or reinitializes the decoding process at the decoder and starts a new coded video sequence. In some examples, an IDR picture and any picture following the IDR picture in decoding order cannot be dependent on any picture that comes before the IDR picture in decoding order.

The third SAP type (type 3) corresponds to open-GOP (Group of Pictures) random access points, hence broken link access (BLA) or clean random access (CRA) pictures in HEVC. For example, a CRA picture is also an I-picture. A CRA picture may not refresh the decoder and may not begin a new CVS, allowing leading pictures of the CRA picture to depend on pictures that come before the CRA picture in decoding order. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In some embodiments, in the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

The fourth SAP type (type 4) corresponds to gradual decoding refresh (GDR) random access points.

Figure 4:
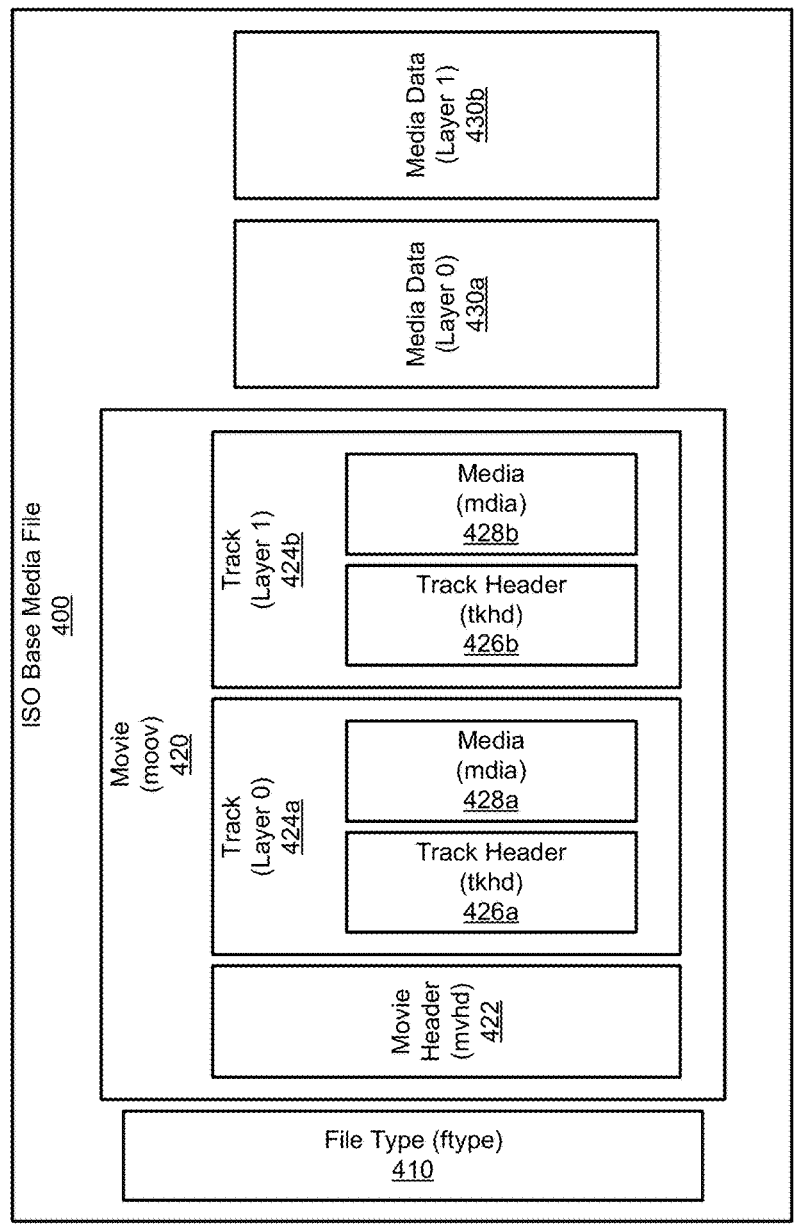
FIG. 4 illustrates an example of an ISO base media file for a video presentation that includes two layers.

FIG. 4 illustrates an example of an ISO base media file 400 for a video presentation that includes two layers. As discussed above, a video presentation can include multiple layers, including a base layer and one or more enhancement layers. In the example of FIG. 4, the video includes a base layer in Layer 0 and an enhancement layer in Layer 1. In other examples, a video can include more than one enhancement layer.

At the top level of the file 400, the ISO base media file 400 includes a file type box 410, a movie box 420, and two media data boxes 430a, 430b, one each for the samples for Layer 0 and Layer 1. The file type box 410 can identify a brand (e.g., an iteration or derivation of the ISOBMFF specification) that is the most suitable for reading the file 400. The file type box 410 can also identify a list of compatible brands, that is, other brands that are suitable for reading the file 400.

The movie box 420 can include the metadata for the video presentation. The movie box 420 can include a movie header box 422, which can contain information about the presentation as a whole. The movie box 420 can also include one or more track boxes. In the illustrated example, the movie box 420 includes two track boxes 424a, 424b, one each for the metadata for Layer 0 and for the metadata for Layer 1. In other examples, the metadata for both Layer 0 and Layer 1 can be included in one track box. In examples where the presentation includes more than two layers, all of the layers can be included in one track or some tracks can have only one layer while other tracks have two or more layers.

Each of the track boxes 424a, 424b include a track header box 426a, 426b. The track header boxes 426a, 426b can describe the characteristics of the track referenced by the respective track box 424a, 424b. For example, the track header boxes 426a, 426b can include a width, height, and layer ID, among other things, for the pictures in the track.

Each of the track boxes 424a, 424b can each further include a media data box 428a, 482b. The media data boxes 428a, 428b include descriptions of the samples in layers contained in each respective track. The description for a sample can include, for example, the location of the sample within the file 400 (or within another file), descriptions of temporally co-located samples, and/or descriptions of reference samples, among other things.

The media data boxes 430a, 430b contain the samples for the two layers. Samples contain the data for the media contained in the ISO base media file 400. In the illustrated example, the samples can contain video data and audio data. In this example, the samples for Layer 0 are located in one media data box 430*a* and the samples for Layer 1 are located in a second media data box 430*b*. In other examples, the samples for both layers can be included in the same media data box. In other examples, the samples for one layer can be included in multiple media data boxes. In other examples, the samples can be contained in other files.

As discussed above, an HEVC bitstream can include, as the last NAL unit in the last access unit of the bitstream, an end-of-bitstream (EOB) NAL unit. The EOB NAL unit can signal to a decoder that the end of the bitstream has been reached. When the bitstream is a multi-layer bitstream, an encoder will properly place the EOB NAL unit in the last access unit in the bitstream. When the bitstream is subsequently written to (e.g., stored to or stored within) a file, however, issues may arise relating to the location of the EOB NAL unit.

Figure 5A:
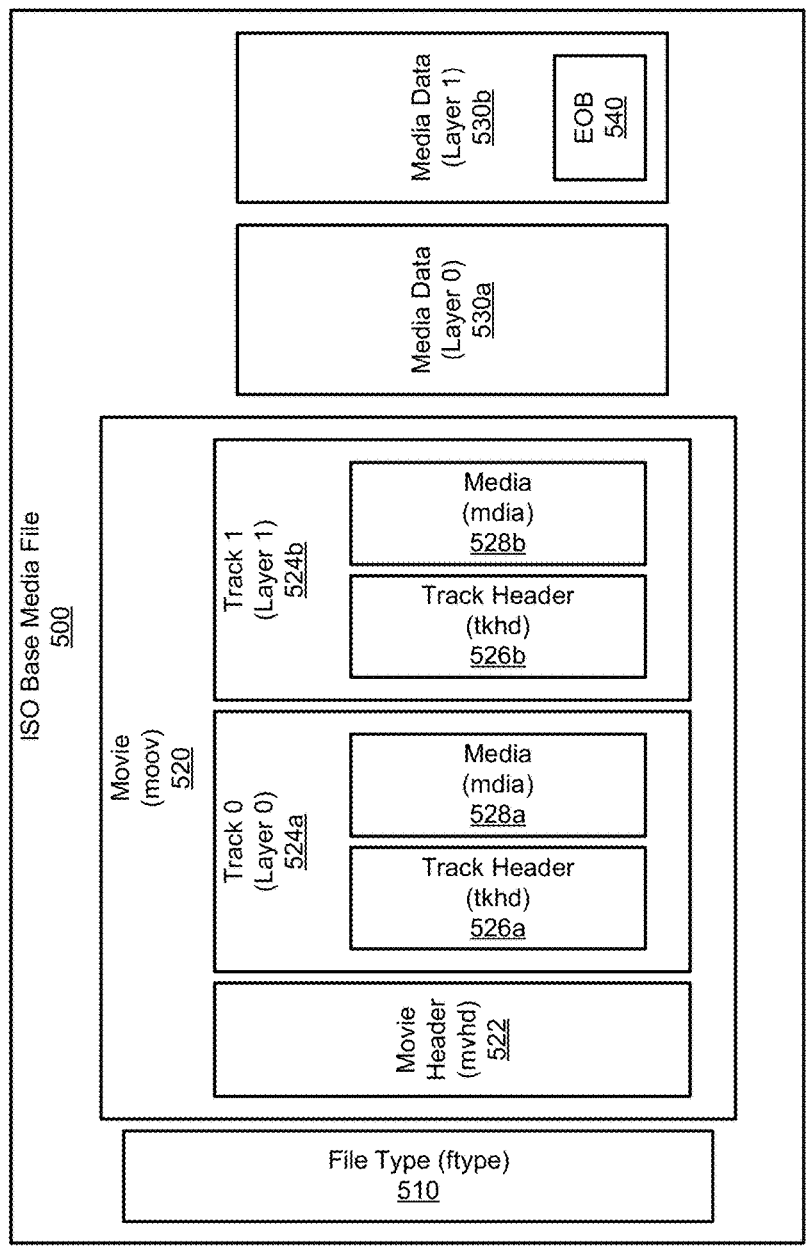
FIG. 5A illustrates one example of an ISO base media file in which a multi-layer bitstream has been stored.

FIG. 5A illustrates one example of an ISO base media file 500 in which a multi-layer bitstream has been stored. In the illustrated example, the bitstream includes a base layer in Layer 0 and an enhancement layer in Layer 1. The example file 500 further includes a file type box 510, which can specify the brand(s) or particular iterations of the ISOBMFF or derivations of the ISOBMFF with which the file 500 is compatible. The file 500 can also include a movie box 520, which can contain the metadata for the bitstream. The example file 500 also includes media data boxes 530*a*, 530*b*, which can contain samples for the bitstream.

The movie box 520 in this example includes a movie header box 522 and two track boxes 524*a*, 524*b* for Track 0 and Track 1. The movie header box 522 can include information that describes the presentation as a whole. In this example, Layer 0 is in Track 0; thus the first track box 524*a* includes the metadata for Layer 0. Furthermore, Layer 1 is in Track 1; hence the second track box 524*b* includes the metadata for Layer 1. In other examples, the metadata for both layers can be in one track box. In other examples, the bitstream can include more than two layers. In these examples, some tracks can include one layer and/or some tracks can include two or more layers.

Each track box 524*a*, 524*b*, in this example, includes a track header box 526*a*, 562*b* and a media box 528*a*, 528*b*. The track header boxes 526*a*, 562*b* can describe the track, while the media boxes 528*a*, 528*b* can include descriptions of the samples in the track.

As discussed above, the bitstream that is stored in the file 500 can have an EOB NAL unit 540. In the illustrated example, an encoder placed the EOB NAL unit 540 at the end of the data in the enhancement layer, Layer 1. In this example, the EOB NAL unit 540 can therefore be found in Track 1.

Figure 5B:
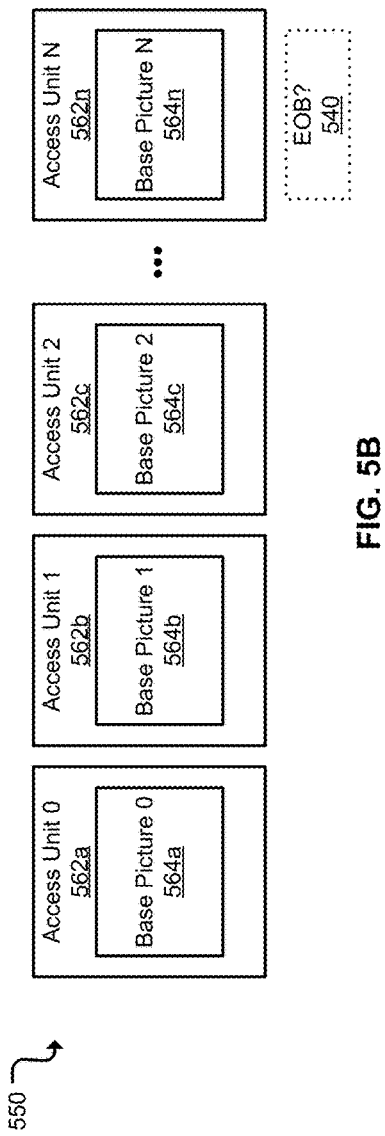
FIG. 5B and FIG. 5C illustrate examples of bitstreams that can result when the ISO base media file illustrated in FIG. 5A is read by different decoder devices.
Figure 5C:
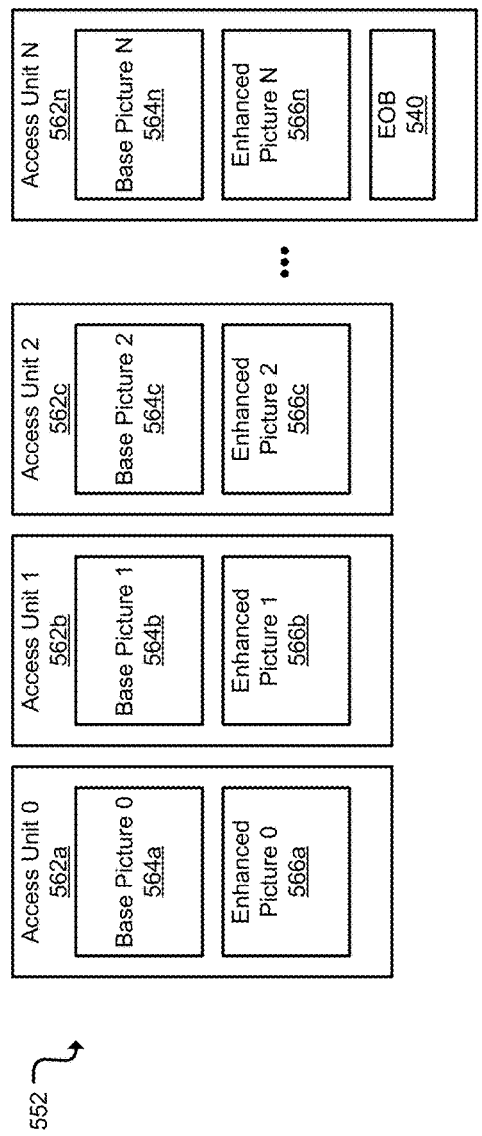

In some cases, placement of the EOB NAL unit 540 in Track 1 can be problematic for a file parsing engine of a decoding device. FIG. 5B and FIG. 5C illustrate examples of bitstreams 550, 552 that can result when the ISO base media file 500 illustrated in FIG. 5A is read by different decoder devices. In FIG. 5B, the decoding device reads only Track 0. The bitstream 550 extracted from the file 500 thus includes a series of access units 562*a*, 562*b*, 562*c*, 562*n* that each include a base picture 564*a*, 564*b*, 564*c*, 564*n* from the base layer. In the example of FIG. 5A, however, the EOB NAL unit 540 was in Track 1; hence, the EOB NAL unit 540 is not included in the reconstructed bitstream 550.

In the example of FIG. 5B, the decoding device may have read only Track 0, for example, because the decoding device was configured to play only the base layer (e.g., an enhancement layer was not selected for display). Alternatively or additionally, the decoding device may have only been able to play the base layer (e.g., the decode device is only AVC compatible, and the base layer included the bitstream encoded with AVC). The decoding device may otherwise have read only Track 0 for other reasons.

In the example of FIG. 5C, the decoding device extracted both the base layer and the enhancement layer from the file 500. The resulting bitstream 552 thus includes a series of access units 562*a*, 562*b*, 562*c*, 562*n* that each include a base picture 564*a*, 564*b*, 564*c*, 564*n* from the base layer and an enhanced picture 566*a*, 566*b*, 566*c* 566*n* from the enhancement layer. In this example, because the EOB NAL unit 540 was in the enhancement layer, when the enhancement layer is extracted from the file the EOB NAL unit 540 is also extracted, and properly placed in the last access unit 562*n*.

In the example of FIG. 5C, the decoding device may have read both Track 0 and Track 1 because, for example, the enhancement layer was selected for display, and the enhancement layer required the data from the base layer. The decoding device may have otherwise read both tracks for other reasons.

Figure 6A:
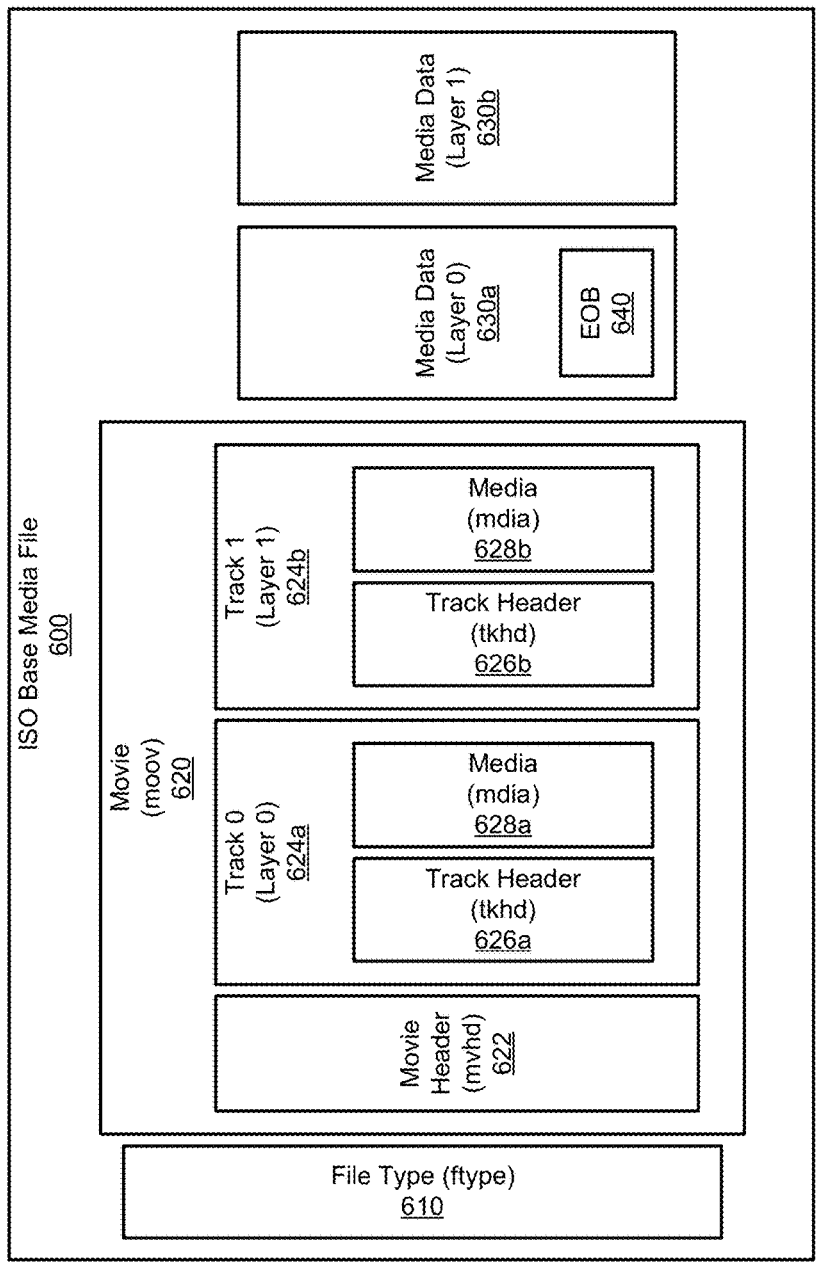
FIG. 6A illustrates another example of an ISO base media file in which a multi-layered bitstream has been stored.

FIG. 6A illustrates another example of an ISO base media file 600 in which a multi-layered bitstream has been stored. In the illustrated example, the bitstream includes a base layer in Layer 0 and an enhancement layer in Layer 1. The example file 600 further includes a file type box 610, which can specify the brand(s) or particular iterations of the ISOBMFF or derivations of the ISOBMFF with which the file 600 is compatible. The file 600 can also include a movie box 620, which can contain the metadata for the bitstream. The example file 600 also includes media data boxes 630*a*, 630*b*, which can contain samples for the bitstream.

The movie box 620 in this example includes a movie header box 622 and two track boxes 624*a*, 624*b* for Track 0 and Track 1. The movie header box 622 can include information that describes the presentation as a whole. In this example, Layer 0 is in Track 0, and thus the first track box 624*a* includes the metadata for Layer 0. Furthermore, Layer 1 is in Track 1, hence the second track box 624*b* includes the metadata for Layer 1. In other examples, the metadata for both layers can be in one track box. In other examples, the bitstream can include more than two layers. In these examples, some tracks can include one layer and/or some tracks can include two or more layers.

Each track box 624*a*, 624*b*, in this example, includes a track header box 626*a*, 626*b* and a media box 628*a*, 628*b*. The track header boxes 626*a*, 626*b* can describe the track, while the media boxes 628*a*, 628*b* can include descriptions of the samples in the track.

As discussed above, the bitstream that is stored in the file 600 can have an EOB NAL unit 640. In the illustrated example, an encoder device has placed the EOB NAL unit 640 in the base layer, and the EOB NAL unit 640 can thus be found in Track 0. In various implementations, the encoder device may have been required to place the EOB NAL unit 640 in the base layer due to an encoding constraint. In some cases, the encoder may have placed the EOB NAL unit 640 in the base layer for another reason. For example, the last access unit in the bitstream may have included only a picture in the base layer.

Figure 6B:
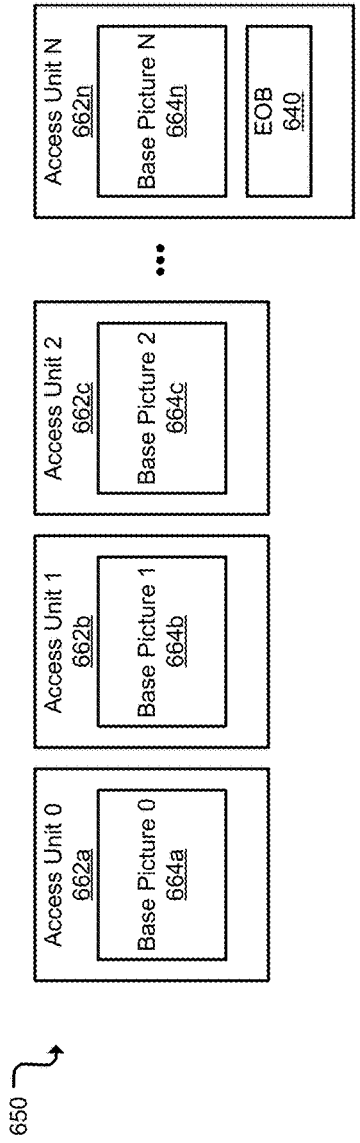
FIG. 6B and FIG. 6C illustrate examples of bitstreams that can result from reading the ISO base media file illustrated in FIG. 6A.
Figure 6C:
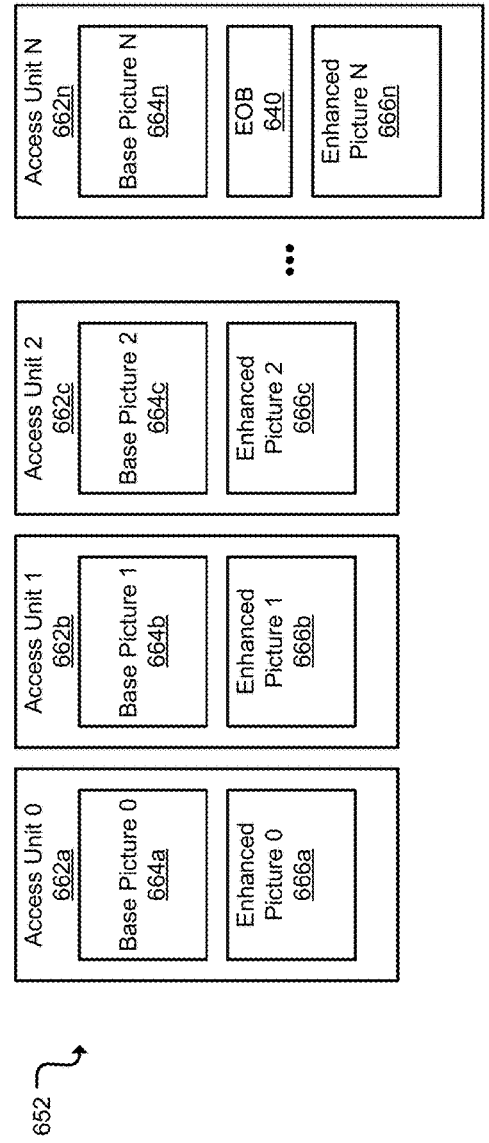

When the EOB NAL unit 640 is in the base layer, problems may be created for a decoder device. FIG. 6B and FIG. 6C illustrate examples of bitstreams 650, 652 that can result from reading the ISO base media file 600 illustrated in FIG. 6A. In FIG. 6B, a decoding device required only the base layer of the bitstream, and thus instructed a file parsing engine to read only Track 0. The resulting bitstream 650 thus includes a series of access units 662*a*, 662*b* 662*c*, 662*n* that each include a base picture 664a, 664b, 664c 664n read from Track 0. In this example, the base layer included the EOB NAL unit 640; thus, the bitstream 650 illustrated in FIG. 6B includes the EOB NAL unit 640 in the last access unit 662n.

In the example of FIG. 6C, the file parsing engine of the decoding device reads both the base layer and the enhancement layer from the file 600. The resulting bitstream 652 thus includes a series of access units 662a, 662b, 662c, 662n that each include a base picture 664a, 664b, 664c 664n read from Track 0 and an enhanced picture 666a, 666b, 666c, 666n read from Track 1. In this example, each access unit was filled first with NAL units from the base layer and then NAL units from the enhancement layer. Because the EOB NAL unit 640 was in the base layer in the example file 600, in the example bitstream 652 the EOB NAL unit 640 is not the last NAL unit in the last access unit. The bitstream 652 may thus not be decoded correctly.

Figure 7:
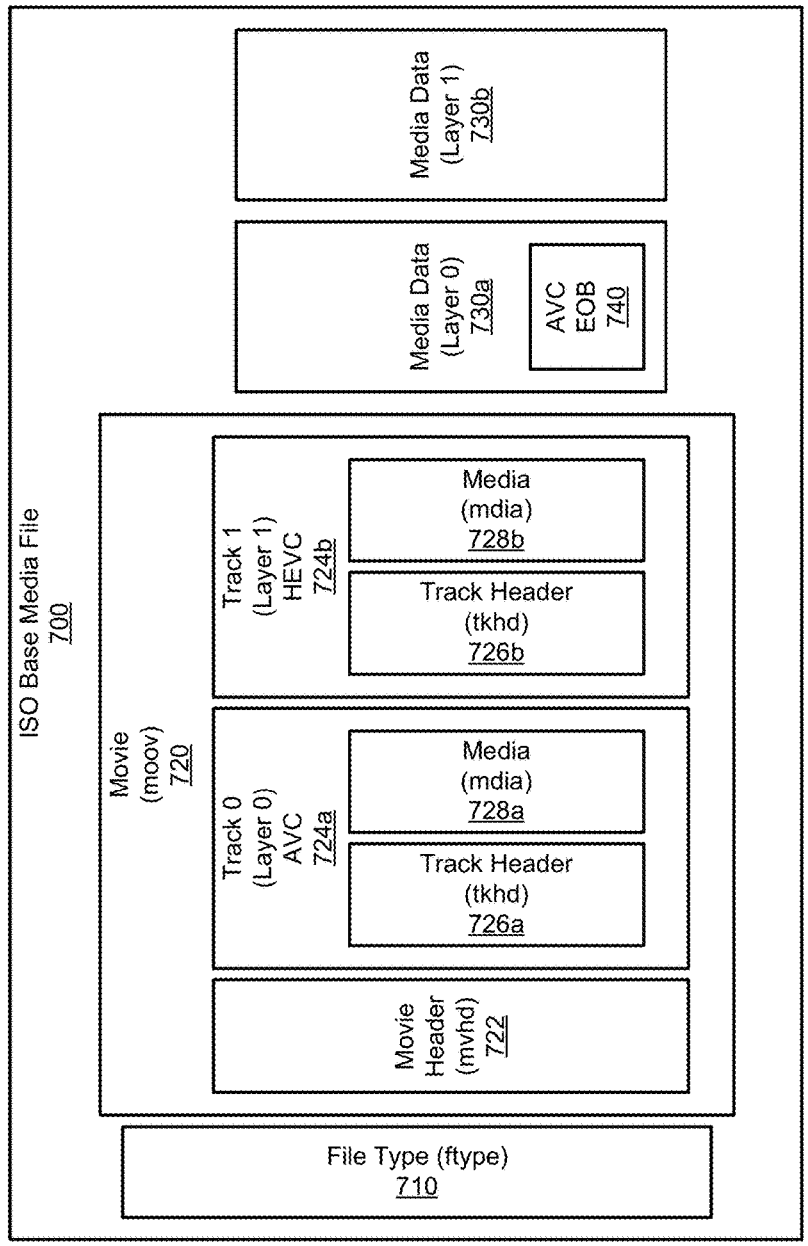
FIG. 7 illustrates another example of an ISO base media file in which a multi-layered bitstream has been stored.

FIG. 7 illustrates another example of an ISO base media file 700 in which a multi-layered bitstream has been stored. In the illustrated example, the bitstream includes an AVC base layer in Layer 0 and an enhancement layer in Layer 1 that includes an HEVC version of the AVC base layer. The base layer may have been encoded using AVC because the bitstream is a legacy bitstream that was not re-encoded for HEVC, or because the bitstream was made to be compatible with the decoder device with older decoder engines, or for some other reason. The enhancement layer may further have been provided so that the same bitstream can be viewed with decoder devices that support HEVC. In other examples, the base layer can have been encoded using a codec other than AVC, such that the base layer includes samples that were not encoded using an HEVC codec.

The example file 700 includes a file type box 710, which can specify the brand(s) or particular iterations of the ISOBMFF or derivations of the ISOBMFF with which the file 700 is compatible. The file 700 can also include a movie box 720, which can contain the metadata for the bitstream. The example file 700 also includes media data boxes 730a, 730b, which can contain samples for the bitstream.

The movie box 720 in this example includes a movie header box 722 and two track boxes 724a, 724b for Track 0 and Track 1. The movie header box 722 can include information that describes the presentation as a whole. In this example, Layer 0 is in Track 0, and thus the first track box 724a includes the metadata for Layer 0. Furthermore, Layer 1 is in Track 1; hence the second track box 724b includes the metadata for Layer 1. In other examples, the metadata for both layers can be in one track box. In other examples, the bitstream can include more than two layers. In these examples, some tracks can include one layer and/or some tracks can include two or more layers.

Each track box 724a, 724b, in this example, includes a track header box 726a, 762b and a media box 728a, 728b. The track header boxes 726a, 762b can describe the track, while the media boxes 728a, 728b can include descriptions of the samples in the track. For example, the track header box 726a and/or the media box 728a in the box 724a for Track 0 can indicate that the samples for Track 0 were encoded using AVC. Similarly, the track header box 726b and/or media box 728b in the box 724b for Track 1 can indicate that the samples for Track 1 were encoded using HEVC.

As discussed above, the bitstream that is stored in the file 700 can have an EOB NAL unit 740. In the illustrated example, an encoder device has placed the EOB NAL unit 740 in the base layer, such that the EOB NAL unit 740 can be found in Track 0. In various implementations, the encoder device may have been required to place the EOB NAL unit 740 in the base layer due to an encoding constraint. In some cases, the encoder may have placed the EOB NAL unit 740 in the base layer for another reason. For example, the last access unit in the bitstream may have included only a picture in the base layer. In these and other examples, the EOB NAL unit 740 will have been generated according to the AVC codec.

In this example, problems may be created for a decoder device. For example, when the decoder device is HEVC compatible, the decoder device may instruct the file parsing engine to read both the base layer and the enhancement layer from the file 700. The EOB NAL unit 740, however, due to being in the base layer, will be an EOB NAL unit generated using AVC. Thus, even if read from the file 700 and placed at the end of the resulting bitstream, the resulting bitstream may not be fully HEVC compatible, and may not be properly processed by the HEVC decoder device.

Figure 8A:
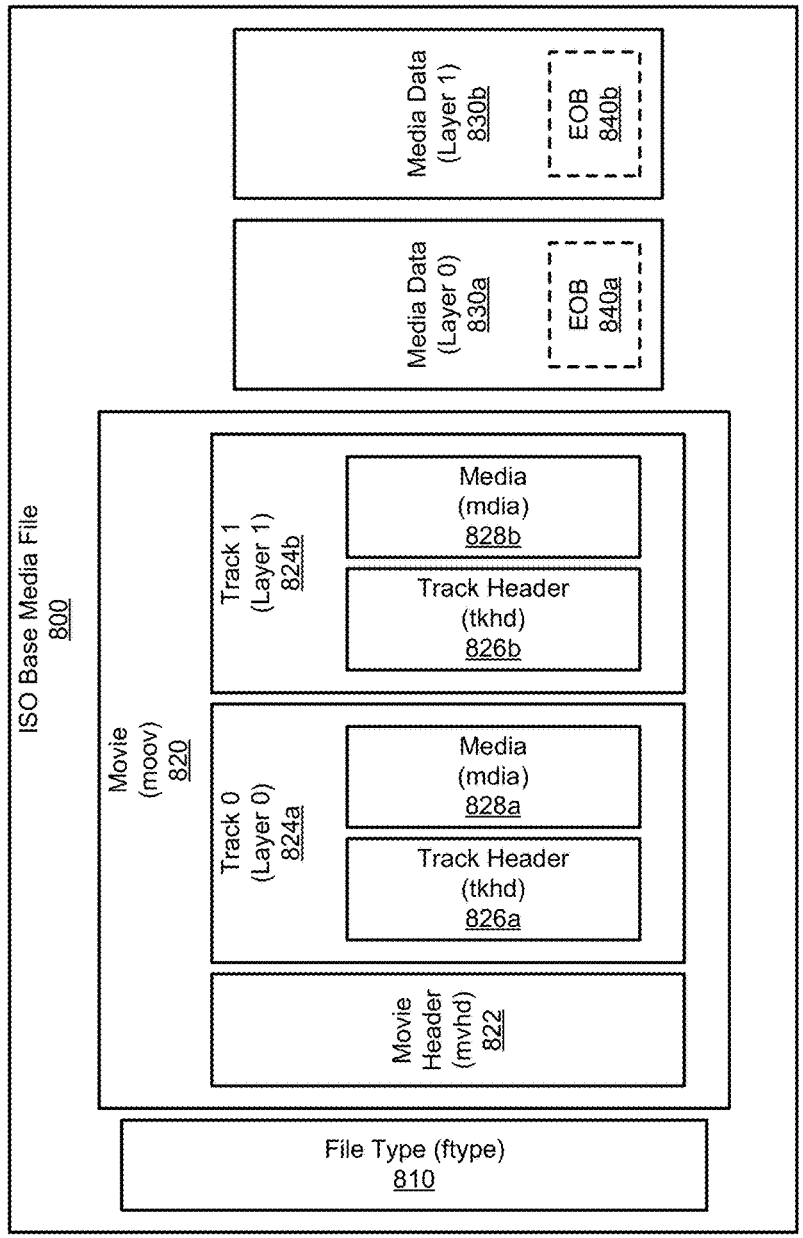
FIG. 8A illustrates an example of an ISO base media file generated according to these techniques.

In various implementations, various techniques can be used to overcome the problems discussed above with regard to the EOB NAL unit. FIG. 8A illustrates an example of an ISO base media file 800 generated according to the techniques of the present disclosure. In the illustrated example, the bitstream includes a base layer in Layer 0 and an enhancement layer in Layer 1. The example file 800 further includes a file type box 810, which can specify the brand(s) or particular iterations of the ISOBMFF or derivations of the ISOBMFF with which the file 800 is compatible. The file 800 can also include a movie box 820, which can contain the metadata for the bitstream. The example file 800 also includes media data boxes 830a, 830b, which can contain samples for the bitstream.

The movie box 820 in this example includes a movie header box 822 and two track boxes 824a, 824b for Track 0 and Track 1. The movie header box 822 can include information that describes the presentation as a whole. In this example, Layer 0 is in Track 0, and thus the first track box 824a includes the metadata for Layer 0. Furthermore, Layer 1 is in Track 1, hence the second track box 824b includes the metadata for Layer 1. In other examples, the metadata for both layers can be in one track box. In other examples, the bitstream can include more than two layers. In these examples, some tracks can include one layer and/or some tracks can include two or more layers.

Each track box 824a, 824b, in this example, includes a track header box 826a, 862b and a media box 828a, 828b. The track header boxes 826a, 862b can describe the track, while the media boxes 828a, 828b can include descriptions of the samples in the track.

In various implementations of the present disclosure, techniques for overcoming problems related to the placement of the EOB NAL unit in the file 800 include relaxing the presence of EOB NAL units in the file such that an EOB NAL unit 840a, 840b may be present in one or more tracks. As illustrated in FIG. 8, Track 0 thus may or may not include an EOB NAL unit 840a. Similarly, Track 1 also may or may not include an EOB NAL unit 840b. In some cases, the EOB NAL units 840a, 840b may be similar. In some cases, the EOB NAL unit 840a in Track 0 may be different from the EOB NAL unit 840b in Track 1. For example, the EOB NAL unit in Track 0 may have been encoded using a codec other than HEVC, while the EOB NAL unit in Track 1 was encoded using an HEVC codec.

Figure 8B:
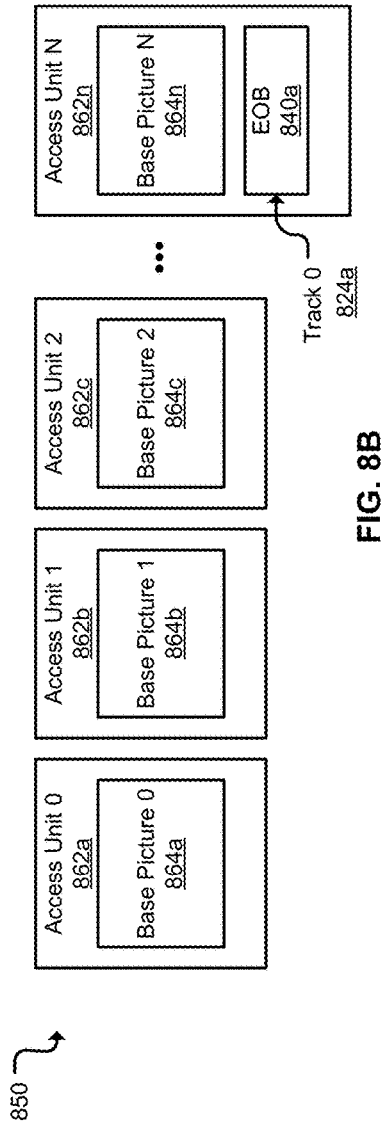
FIG. 8B, FIG. 8C, FIG. 8D, and FIG. 8E illustrate examples of bitstreams that can be constructed from the file illustrated in FIG. 8A.
Figure 8C:
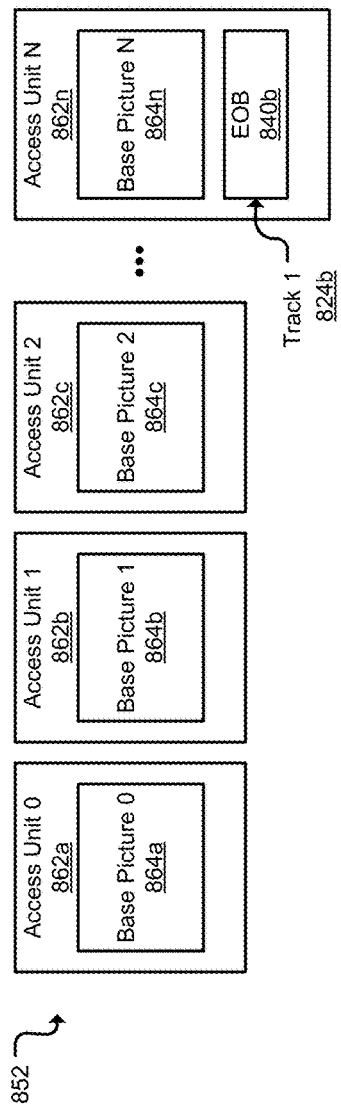

FIG. 8B and FIG. 8C illustrate examples of bitstreams 850, 852 that can be constructed from the file 800 illustrated in FIG. 8A. In both FIG. 8B and FIG. 8C, a decoder device required only the base layer, and thus instructed a file parsing engine to read only Track 0. Each example bitstream 850, 852 thus includes a series of access units 862a 862b, 862c, 862n that each include a base picture 864a, 864b, 864c, 864n from the base layer.

In the example of FIG. 8B, Track 0 included an EOB NAL unit 840a for the base layer, and Track 1 did not include an EOB NAL unit 840b for the enhancement layer. In this example, a file parsing engine of a decoder device can determine that the base layer is the highest layer that includes an EOB NAL unit, meaning that no other "higher" layer (e.g., the enhancement layer) associated with a layer ID value greater (e.g., "higher") than another layer (in this example, the base layer) includes an EOB NAL unit. The file parsing engine may thus include the EOB NAL unit 840a from the base layer in the last access unit 862n of the reconstructed bitstream 850. The resulting bitstream 850 can thus be decoded without any errors related to the EOB NAL unit 840a.

The technique illustrated in FIG. 8B can ensure that, when only Track 0 is read from the file 800, the EOB NAL unit 840a is included in reconstructed bitstream 650. In this example, though the other layers are considered, the file parsing engine can determine that the EOB NAL unit 840a from the base layer is appropriate to use in the bitstream 650.

In the example of FIG. 8C, it may be that Track 0 did not include an EOB NAL unit, and the enhancement layer in Track 1 did include an EOB NAL unit 840b. In this example, when a file parsing engine of a decoder device reads the file 800, the parsing engine can be configured to detect that the base layer does not include an EOB NAL unit. The file parsing engine may further be configured to read (e.g., process) the track for the highest layer (Track 1, in this example) to determine whether the layer in the track includes an EOB NAL unit. In various implementations, when the highest layer track does not include an EOB NAL unit, the file parsing engine may try the track for the next highest layer, and so on until an EOB NAL unit is located or the file parsing engine determines that the file 800 includes no EOB NAL units. In the illustrated example, finding the EOB NAL unit in Track 1, the file parsing engine can place (e.g., include) this EOB NAL unit 840b into (e.g., within) the last access unit 862n of the reconstructed bitstream 852. The resulting bitstream 852 can thus be decoded without any errors related to the EOB NAL unit.

Alternatively, in the example of FIG. 8C, it may be that both Track 0 and Track 1 include EOB NAL units 840a, 840b. In this case, in some implementations, the file parsing engine can be configured to locate the EOB NAL unit 840b in the highest layer (e.g. the enhancement layer, in this example), and place this EOB NAL unit 840b in the last access unit 862n of the reconstructed bitstream 852. Any other EOB NAL units, including the EOB NAL unit 840a from the base layer, can be discarded.

The technique illustrated in FIG. 8C can avoid problems that can be created when a decoder device needs only the base layer, which either does not include an EOB NAL unit or includes an EOB NAL unit that is potentially incompatible with the decoder device's decoder engine. For example, when the example file 800 does not include an EOB NAL unit in the base layer, an EOB NAL unit from a higher layer can be provided instead. As another example, when the EOB NAL unit in the base layer was encoded using AVC but the decoder device includes an HEVC decoder engine, an HEVC EOB NAL unit from a higher layer can be substituted for the EOB NAL unit in the base layer.

Figure 8D:
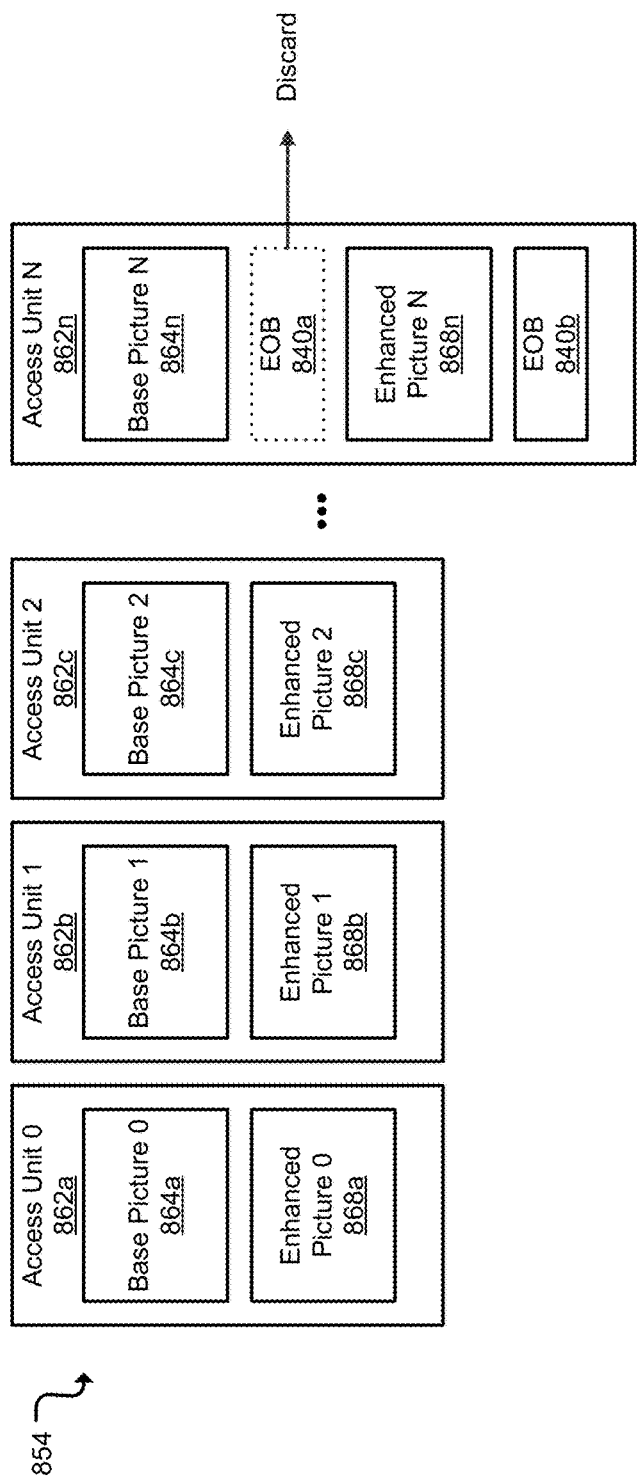
Figure 8E:
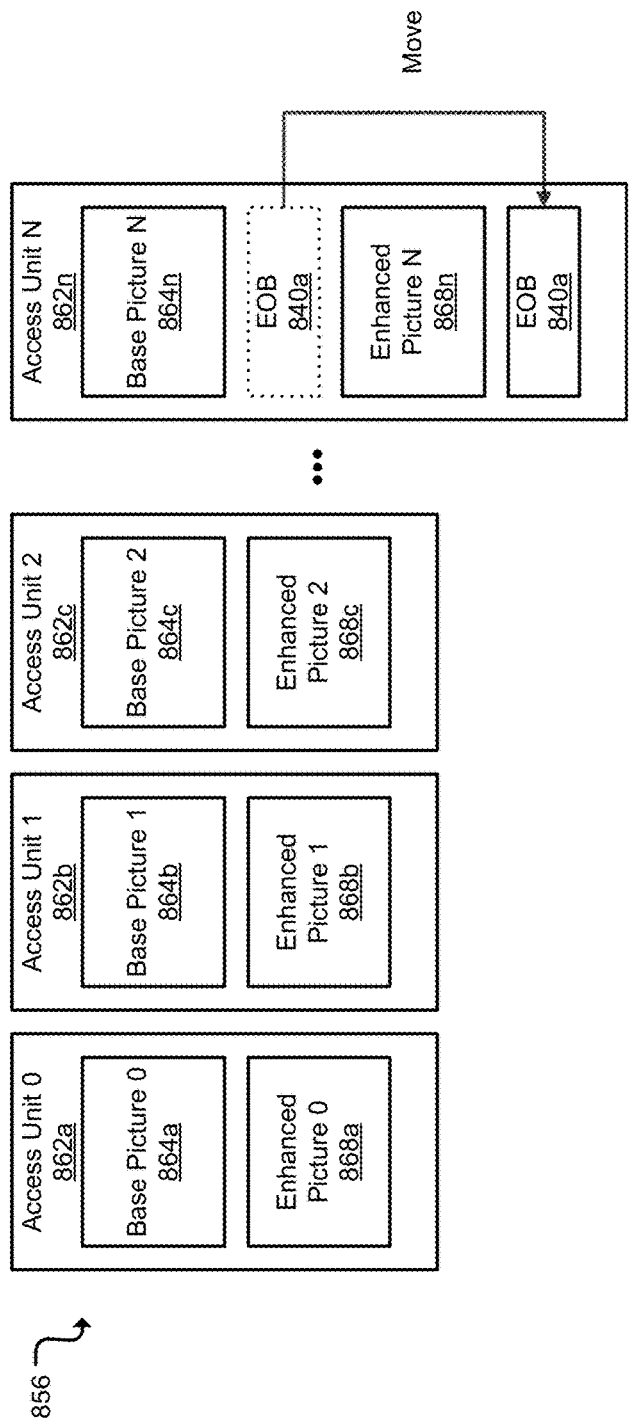

FIG. 8D and FIG. 8E illustrate additional examples of bitstream 854, 856 that can be constructed from the file 800 illustrated in FIG. 8A. In both FIG. 8D and FIG. 8E, a decoder device required both the base layer and the enhancement layer, and thus instructed a file parsing engine to read both Track 0 and Track 1. Each example bitstream 850, 852 thus includes a series of access units 862a 862b, 862c, 862n that each include a base picture 864a, 864b, 864c, 864n from the base layer and an enhanced picture 868a, 868b, 868c, 868n from the enhancement layer.

In the example of FIG. 8D, both the base layer and the enhancement layers included EOB NAL units 840a, 840b. In this example, in various implementations, a file parsing engine of a decoder device can be configured to include only the EOB NAL unit 840b from the highest layer (the enhancement layer, in this example) and to discard any other EOB NAL units (e.g., the EOB NAL unit 840a from the base layer). The reconstructed file 854a thus includes only the EOB NAL unit 840b from the enhancement layer (e.g., the highest layer).

The technique illustrated in FIG. 8D can avoid creating a bitstream that includes more than one EOB NAL unit or that includes only an EOB NAL unit from the base layer. For example, when the file would otherwise have only an EOB NAL unit in the base layer, an EOB NAL unit in the enhancement layer is allowed so that a reconstructed bitstream that includes both layers does not have only the EOB NAL unit from the base layer, improperly located in the middle of the last access unit. A file parsing engine of a decoder device can further ensure that the bitstream does not have more than one EOB NAL unit.

In the example of FIG. 8E, the base layer includes an EOB NAL unit 840a, but the enhancement layer does not include an EOB NAL unit. In this example, in various implementations, a file parsing engine of a decoder device identifies the EOB NAL unit that is in the highest layer (the base layer, in this example), and reorders the NAL unit read from the file such that the EOB NAL unit from the highest layer is moved to the end of the last access unit 862n. Any other EOB NAL unit can be discarded.

The technique illustrated in FIG. 8E can avoid creating a bitstream with an EOB NAL unit that is not at the end of the last access unit. For example, when the base layer includes an EOB NAL unit but the enhancement layer does not, then without the illustrated technique the EOB NAL unit would be placed somewhere in the middle of the last access unit 862n, rather than at the end.

The various techniques discussed above thus can resolve issues that can be created around the placement of EOB NAL units when a bitstream is written to (e.g., stored) a file. Stated more generally, the above techniques provide that, when an EOB NAL unit is part of a picture that is not from the highest layer, the EOB NAL unit shall be placed at the end of the last access unit during reconstruction of the bitstream, unless there is an EOB NAL unit present as part of a picture in the highest layer. In the latter case, the EOB NAL unit from the highest layer shall be included in the last access unit. Alternatively or additionally, when more than one EOB NAL unit is present in an access unit, the EOB NAL unit that is part of the picture with the highest layer ID value shall be used, and any other EOB NAL units shall be discarded.

Figure 9:
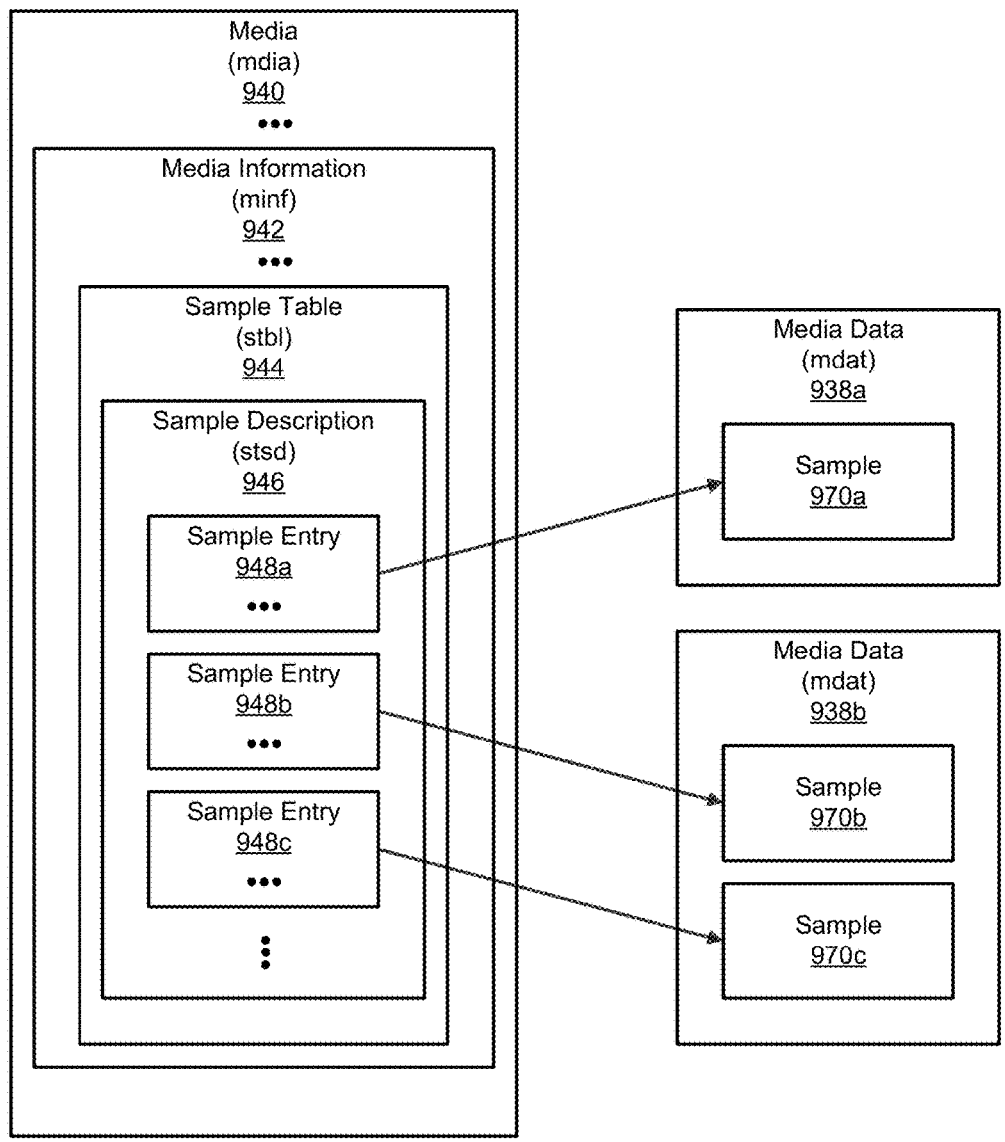
FIG. 9 illustrates an example of a media box and media data boxes that can be included in an ISO base media file.

FIG. 9 illustrates an example of a media box 940 and media data boxes 938a, 938b that can be included in an ISO base media file. As discussed above, a media box can be included in a track box, and can contain objects and information that describe media data in the track. In the illustrated example, the media box 940 includes a media information box 942. The media box 940 can also include other boxes, which are not illustrated here.

The media information box 942 can contain objects that describe characteristic information about the media in the track. For example, the media information box 942 can include a data information box, which describes the location of media information in the track. As another example, the media information box 942 can include a video media header, when the track includes video data. The video media header can contain general presentation information that is independent of the coding of the video media. The media information box 942 can also include a sound media header when the track includes audio data.

The media information box 942 can also include a sample table box 944, as provided in the illustrated example. The sample table box 944, identified by the box type "stbl," can provide locations (e.g., locations with a file) for the media samples in the track, as well as time information for the samples. Using the information provided by the sample table box 944, a player device can locate samples in correct time order, determine the type of a sample, and/or determine the size, container, and offset of a sample within a container, among other things.

The sample table box 944 can include a sample description box 946, identified by the box type "stsd." The sample description box 946 can provide detailed information about, for example, the coding type used for a sample, and any initialization information needed for that coding type. The information stored in the sample description box can be specific to the type of track that includes the samples. For example, one format may be used for the sample description when the track is a video track and a different format may be used when the track is a hint track. As a further example, the format for the sample description may also vary depending on the format of the hint track.

The sample description box 946 can include one or more sample entries 948a, 948b, 948c. The sample entry type is an abstract class, and thus typically the sample description box 946 includes specific sample entries, such as a visual sample entry for video data or an audio sample entry for audio samples, among other examples. A sample entry box can store the parameters for a particular sample. For example, for a video sample, the sample entry box can include a width, height, horizontal resolution, vertical resolution, frame count, and/or depth for the video sample, among other things. As another example, for an audio sample, the sample entry can include a channel count, a channel layout, and/or a sampling rate, among other things.

The samples 970a, 970b, 970c described by the sample entries 948a, 948b, 948c are stored in media data boxes 938a, 938b. The media data boxes 938a, 938b can be included in the top level of a file. The samples referenced in the sample description box 946 can be included in different media data boxes 938a, 938b, or can be included in one media data box. The media data boxes 938a, 938b can be in the same file as the media box 940 and/or can be in other files.

In addition to the issues discussed above, various issues arise with respect to the writing of tile tracks to a file formatted according to the ISOBMFF or a format derived from the ISOBMFF.

Certain versions of the HEVC standard provide support for coding of rectangular regions called tiles. These regions may have coding dependencies with other tiles from previously coded pictures or may be independently decoded. A tile can be described as a single rectangular region, corresponding to one or more slices in a frame. Tiles can be grouped into tile sets, which correspond to several tiles coded in a single slice. Tile sets can be used to describe dependencies between tiles and/or describe a region of interest spanning several tiles.

A track in an ISO base media file that includes samples for tiles is typically referred to as a tile track. Tile tracks may have requirements that distinguish these tracks from other tracks. The following excerpt from clause 10.6.1 of ISO/IEC 14496-15 provides some examples of these requirements:

"An HEVC (respectively LHEHC) tile track is a video track for which there is a 'tbas' reference to the HEVC (respectively LHEVC) track carrying NALUs of the associated HEVC layer to which the tile(s) belong. The sample description type for an HEVC tile track shall be 'hvt1'. The sample description type for an LHEVC tile track shall be 'lht1'.

"Neither the samples in the tile track or the sample description box shall contain VPS, SPS or PPS NAL units, these NAL units shall be in the samples or in the sample description box of the track containing the associated layer, as identified by the track reference. Both the HEVC/LHEVC tile track and the track containing the associated layer, as indicated by the 'tbas' track reference, may use extractors, as defined in Annex B, to indicate how the original bitstream is reconstructed; presence of extractors in these tracks may be constrained in some application domains."

In the above, a track that includes the layer to which a tile track belongs, which is referenced by the tile track's 'tbas' reference, can be referred to as the base track.

As noted in the above excerpt, extractors can be used to reconstruct a tiled bitstream. An extractor is a structure in an ISO base media file that enables extraction of NAL units from tracks other than the track that contains the extractor. Specifically, an extractor contains an instruction to extract data from another track, which is linked to the track in which the extractor resides. Clause 10.6.4 of ISO/IEC 14496-15 describes the use of extractors with regard to tile tracks as follows:

"An HEVC or L-HEVC track using tile tracks may use extractors to reference data from its tile tracks, in which case the track shall have 'scal' track references to the tile tracks."

In some cases, it may be possible that a circular extractor reference can occur when an ISO base media file includes HEVC and L-HEVC tile tracks. For example, as noted above, parameter sets (e.g., VPS, SPS or PPS NAL units) are not stored in a tile track, and instead can be found in the sample description box or samples of the track that contain the layer associated with the tile track (e.g., the base track). Samples in the tile track thus use extractors to refer to the parameter sets. In some cases, however, the base track may itself use extractors to refer to NAL units in the tile track as provided by the above quote from clause 10.6.4. A circular reference between the samples of the tile track and the samples in the base track may thus be created.

Various techniques can be used to overcome circular extractor references in tile tracks, should such references occur. For example, a constraint can be defined such that when a track contains an 'scal' track reference to a tile track, the referenced tile track shall not contain extractors. In this example, parameter sets shall only be present in the sample entry, and not in samples of the base track referred to by the 'tbas' track reference.

In some cases, reconstruction, from an ISO base media file, of one or more tiled access units can also encounter problems. Reconstruction of tiled access units is described in clause 10.6.4 of IOS/IEC 14496-14, and can be summarized as follows: for implicit reconstruction, an HEVC or L-HEVC track using tile tracks shall indicate the tile ordering using a 'sabt' track reference to tile tracks; the sample of the HEVC or LHEVC track is reconstructed by appending to the sample data the NAL units contained in the samples with the same decoding time (e.g., using the time-to-sample table only without considering edit lists) in all tracks indicated in the 'sabt' track references of this track, in the order of the track references.

A problem can occur with the above reconstruction method when an HEVC or LHEVC tile track uses an extractor (e.g., to reference the parameter sets NAL unit contained in the HEVC or LHEVC track sample). In some cases, the data referred to by the extractor will be duplicated in the final reconstructed tiled access unit.

Various techniques can be used to avoid duplication of data in a tiled access unit. For example, a constraint can be applied such that an HEVC or L-HEVC tile track shall not use an extractor to reference the tile track's 'tbas' track. As another example, in the reconstruction of tile access units, when implicit reconstruction is used, extractors to 'tbas' tracks shall be ignored. As a further example, a constraint can be applied such that, for implicit reconstruction of a tiled access unit, extractors in the tile tracks, if present, shall be ignored.

As provided by the excerpt from clause 10.6.1 of ISO/IEC 14496-15 quoted above, HEVC and L-HEVC tile tracks can use extractors. For example, a tile track may extract samples from a track referred to by the tile track's 'tbas' reference (e.g., the base track). Decoding and/or playback of a tile track thus requires the presence of the base track. Since one purpose of extractors is to provide for more compact formation of tracks, having a tile track use an extractor appears to be counter to this purpose.

Various techniques can be used to avoid the use of extractors in tile tracks where no benefit is gained from such use. For example, in various implementations, use of extractors in any tile track can be prohibited.

Another problem related to tile track that may arise occurs when only the video part from an HEVC or L-HEVC tile track is required. In this situation, the ISO/IEC 14496-15 specification does not specify the data that a false parser should generate for a decoder engine.

Various techniques can be used to overcome the missing specification in ISO/IEC 14496-15 regarding stream or access unit construction when only the video part of an HEVC or L-HEVC tile track is required. For example, the following process can be used: first, the parameter sets and supplemental enhancement information (SEI) NAL units contained in a sample entry can be output. Next, other NAL units can be output in the following order: NAL units in the first sample (referred to hereafter as "firstSampleInBaseTrack,") in the base track (as indicated by the 'tbas' track reference) that must be present before VCL NAL units (e.g., parameter set NAL unit, prefix SEI NAL units, etc.); NAL units in firstSampleInBaseTrack's corresponding sample in the tile track; NAL units in firstSampleInBaseTrack that must be present after VLC NAL units (e.g., EOS NAL unit, EOB NAL unit); NAL units in the second sample (referred to hereafter as "secondSampleInBaseTrack") in the base track that must be present before VLC NAL units; NAL units in secondSampleInBaseTrack's corresponding sample in the tile track; NAL unit in the secondSampleInBaseTrack that must be present after VLC NAL units, and so on.

In the above process, samples in the base track and the tile track are synchronized by decoding times. In other words, a sample in the base track and its corresponding sample in the tile track have the same decoding time.

One use case for HEVC and L-HEVC tile tracks is decoding of a region of interest (ROI) within a picture, instead of decoding an entire picture. In such a case, the part of the picture that is stored in a tile track can be decoded. To do so, the relative position of a tile within the picture may need to be known.

Various techniques can be used to signal the position of a tile within a picture. For example, offset information can be included in a sample entry of an HEVC or L-HEVC tile track. The offset information can include a horizontal and/or vertical offset. The offset can be provided in pixel units, picas, centimeters, fractions of an inch, macroblocks, or some other unit of measure.

To provide offset information for tile tracks, modifications to Sections 10.6.2.2 and 10.6.3.2 of ISO/IEC 14496-15 are proposed. The text of these sections is provided below, with text added to these sections indicating using underlined text (example of added text).

10.6.2.2 Syntax

```
class HEVCTileConfigurationBox extends Box('hvtC') {
    unsigned int(16) horizontal_offset;
    unsigned int(16) vertical_offset;
    HEVCTileTierLevelConfigurationRecord( )
    HEVCTileTierLevelConfig;
}
``` horizontal_offset and vertical_offset give the horizontal and vertical offsets, in units of luma samples, of the top-left luma sample of the rectangular region represented by the tile represented by this track, relative to the top-left luma sample of the picture represented by the 'tbas' reference track.

10.6.3.2 Syntax

```
class LHEVCTileSampleEntry( ) extends VisualSampleEntry ('lht1'){
    unsigned int(16) min_horizontal_offset;
    unsigned int(16) min_vertical_offset;
    unsigned int(16) max_horizontal_offset;
    unsigned int(16) max_vertical_offset;
    MPEG4BitRateBox ( );                    // optional
    Box extra_boxes[ ];                     // optional
}
``` min_horizontal_offset and min_vertical_offset give respectively the horizontal and vertical offsets, in units of luma samples, of the top-left luma sample of the rectangular region represented by the tile, represented by this track, of the lowest layer, relative to the top-left luma sample of the picture of the lowest layer represented by the 'tbas' reference track.

max_horizontal_offset and max_vertical_offset give respectively the horizontal and vertical offsets, in units of luma samples, of the top-left luma sample of the rectangular region represented by the tile, represented by this track, of the highest layer, relative to the top-left luma sample of the picture of the lowest layer represented by the 'tbas' reference track.

Figure 10:
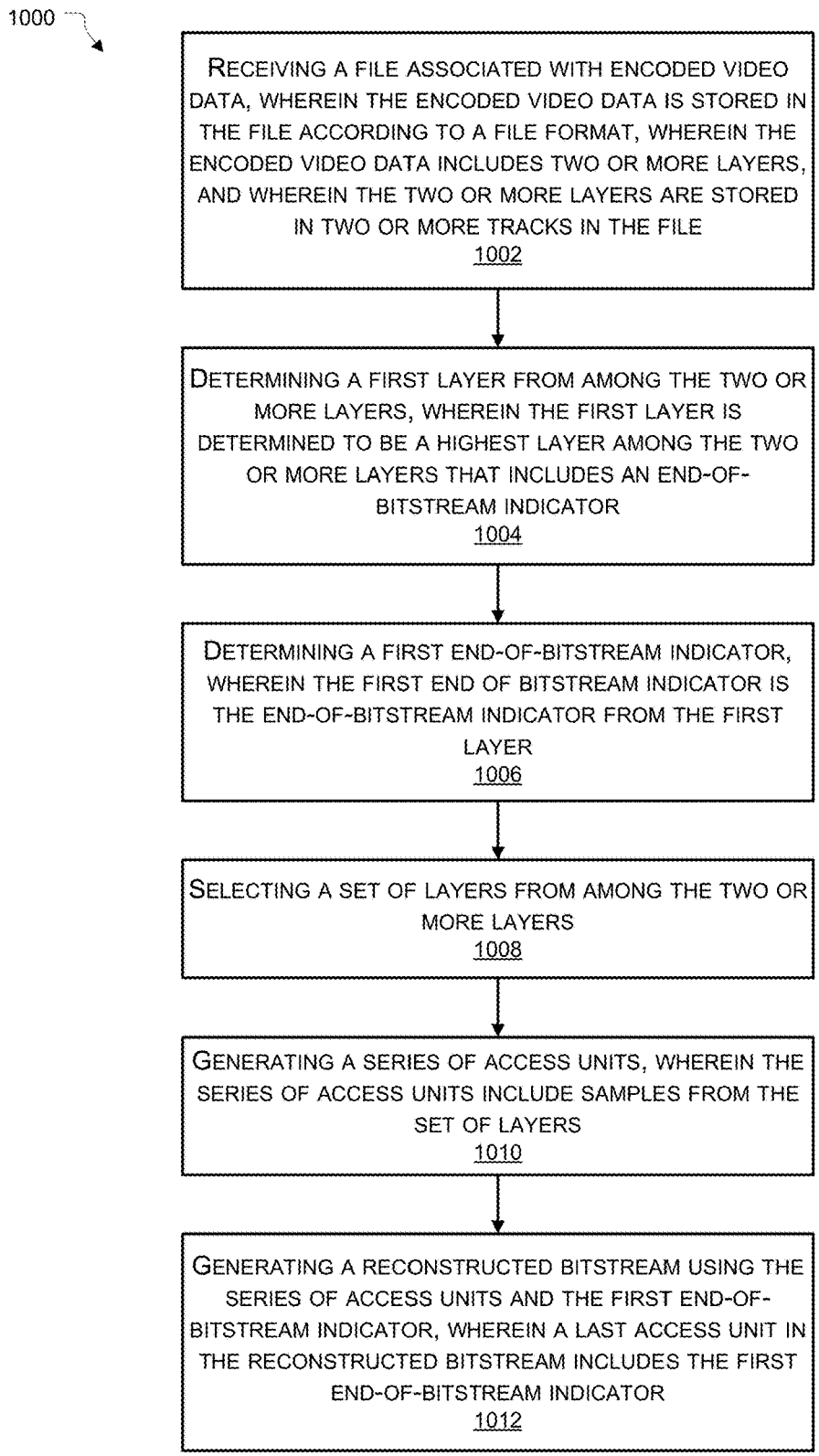
FIG. 10 illustrates an example of a process for processing encoded video data, where a file that includes the encoded video data may have more than one EOB NAL unit.

FIG. 10 illustrates an example of a process 1000 for processing encoded video data, where a file that includes the encoded video data may have more than one EOB NAL unit. At 1002, the process 1000 includes receiving a file associated with encoded video data, wherein the encoded video data is stored in the file according to a file format, wherein the encoded video data includes two or more layers, and wherein the two or more layers are stored in two or more tracks in the file. In some cases, at least two layers in the file can each have an EOB NAL unit. In some cases, only the base layer includes an EOB NAL unit. In some cases, one or more enhancement layers may each have an EOB NAL unit.

At 1004, the process 1000 includes determining a first layer from among the two or more layers, wherein the first layer is determined to be a highest layer (e.g., a layer having the highest layer ID value) among the two or more layers that includes an end-of-bitstream indicator. That is, when the file includes more than one layer that has an EOB indicator, at step 1004 the highest layer that has an EOB indicator is identified (e.g., determined). In some cases, there may be even higher layers (e.g., layers associated with layer ID values greater than the aforementioned highest layer having an EOB indicator) in the file, but these higher layers do not include an EOB.

At 1006, the process 1000 includes determining a first end-of bitstream indicator, wherein the first end-of-bitstream indicator is the end-of-bitstream indicator from the first layer.

At 1008, the process 1000 includes selecting (e.g. identifying) a set of layers from among the two or more layers. In various implementations, the set of layers may be selected based on the samples in the layers being selected for display. In some cases, the set of layers may include fewer than the number of layers in the file. In some cases, the set of layers may include only one layer.

At 1010, the process 1000 includes generating a series of access units, wherein the series of access units include samples from the set of layers.

At 1012, the process 1000 includes generating a reconstructed bitstream using the series of access units and the first end-of-bitstream indicator, wherein a last access unit in the reconstructed bitstream includes the first end-of-bitstream indicator. For example, in some cases, as described above, a last access unit a series of access units may not include an end-of-bitstream indicator. In these cases, the first end-of-bitstream indicator can be added to the last access unit in the series of access units. In various implementations, the first end-of-bitstream indicator may be added to the last access unit in the series of access units during reconstruction of the bitstream. The last access unit in the series of access units may then become the last access unit in the reconstructed bitstream.

In some cases, the set of layers from which the reconstructed bitstream may not include the first layer determined at step 1004. In other words, the set of layers associated with the reconstructed bitstream may not include the layer associated with the greatest layer ID value that also includes an end-of-bitstream indicator. In these cases, the first layer may be a layer associated with a layer ID value that is higher than the highest layer present in the set of layers selected or identified in step 1008. When this is the case, the first end-of-bitstream indicator included within the first layer can be added (e.g., included) to a last access unit in the series of access units, regardless of whether any layers in the set of layers contributed an end-of-bitstream indicator to this last access unit.

In some cases, the first layer determined at step 1004 may be a lower layer than the highest layer in the set of layers determined at step 1008. In these cases, the first end-of-bitstream indicator from the first layer can be moved to a last access unit in the series of access units. The first layer may or may not be in the set of layers.

In some cases, once the last access unit in the reconstructed bitstream is generated has been generated, this last access unit may have more than one end-of-bitstream indicator. When this is the case, each of the end-of-bitstream indicators, other than the first end-of-bitstream indicator from the first layer, may be removed. As a result, the last access unit in the reconstructed bitstream will include only the first end-of-bitstream indicator.

In some examples, the process 1000 may be performed by a computing device or an apparatus, such as the system 100. For example, the process 1000 can be performed by the system 100 and/or the storage 108 or output 110 shown in FIG. 1. In some cases, the computing device or apparatus may include a processor, microprocessor, microcomputer, or other component of a device that is configured to carry out the steps of process 1000. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1000 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
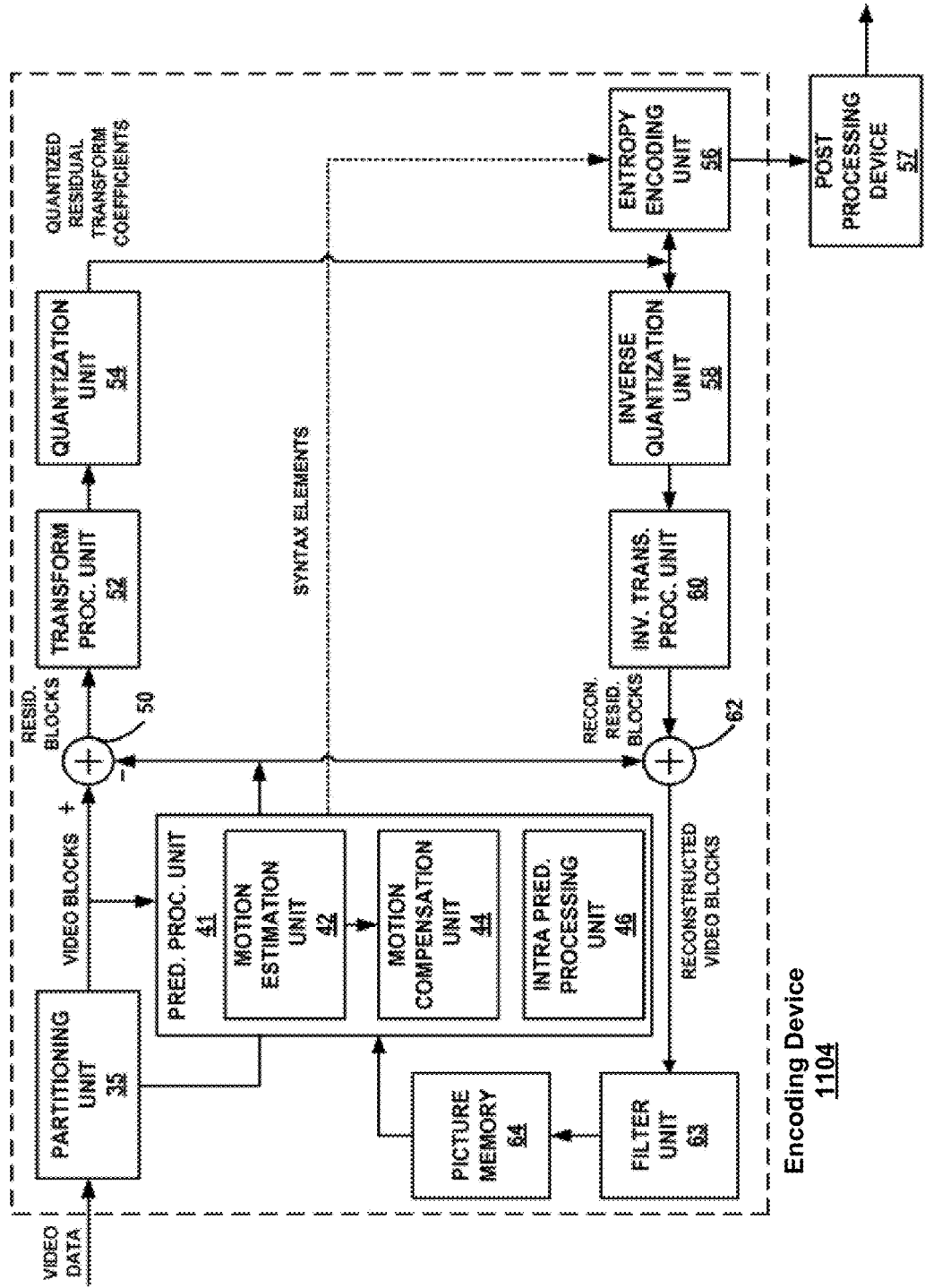
FIG. 11 is a block diagram illustrating an example encoding device.
Figure 12:
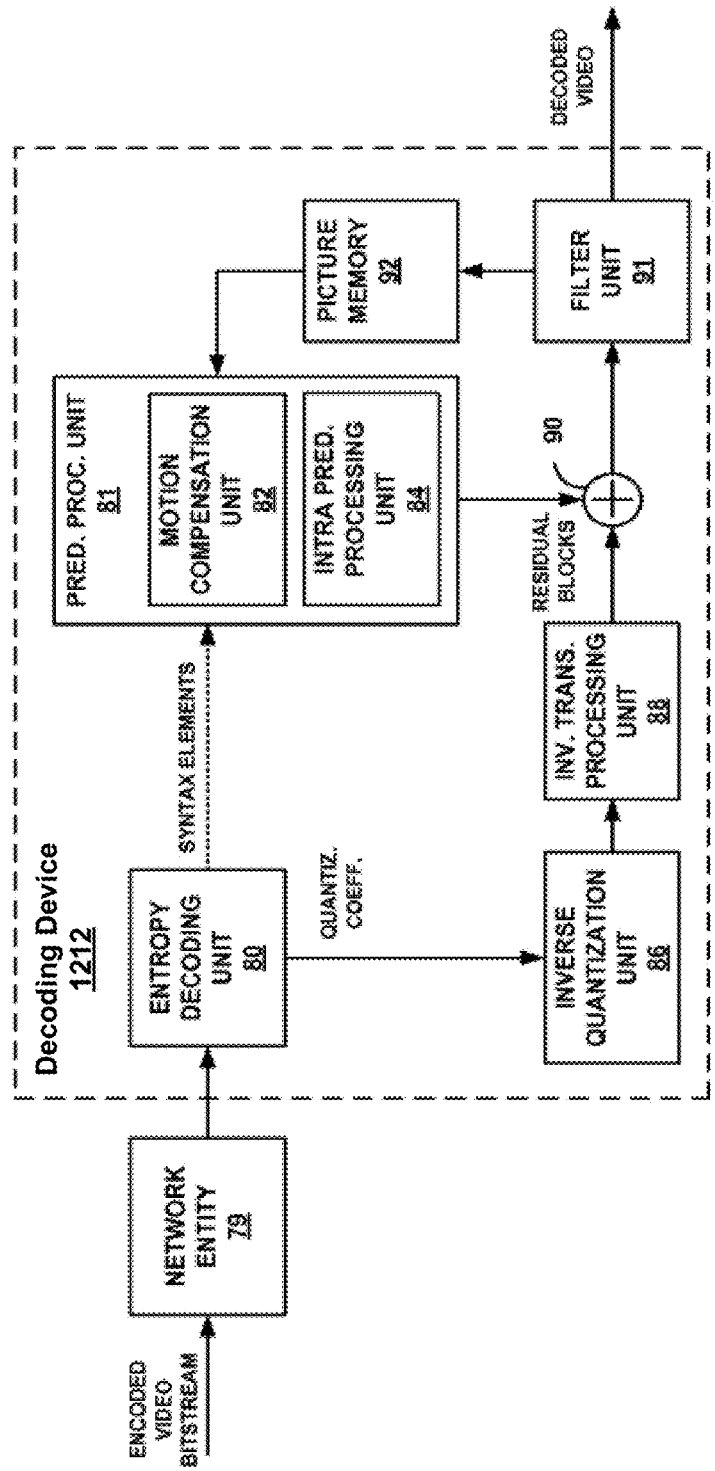
FIG. 12 is a block diagram illustrating an example decoding device.

Specific details of the encoding device 1004 and the decoding device 1212 are shown in FIG. 11 and FIG. 12, respectively. FIG. 11 is a block diagram illustrating an example encoding device 1104 that may implement one or more of the techniques described in this disclosure. Encoding device 1104 may, for example, generate the syntax structures described herein (e.g., the syntax structures of a VPS, SPS, PPS, or other syntax elements). Encoding device 1104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 1104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 1104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 11 as being an in loop filter, in other configurations, filter unit 63 may be implemented as a post loop filter. A post processing device 57 may perform additional processing on encoded video data generated by encoding device 1104. The techniques of this disclosure may in some instances be implemented by encoding device 1104. In other instances, however, one or more of the techniques of this disclosure may be implemented by post processing device 57.

As shown in FIG. 11, encoding device 1104 receives video data, and partitioning unit 35 partitions the data into video blocks. The partitioning may also include partitioning into slices, slice segments, tiles, or other larger units, as well as video block partitioning, e.g., according to a quadtree structure of LCUs and CUs. Encoding device 1104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 1104 may calculate values for sub-integer pixel positions of reference pictures stored in picture memory 64. For example, encoding device 1104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identifies one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 1104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 1212 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 1104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 1104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce the bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 1212, or archived for later transmission or retrieval by decoding device 1212. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 1104 of FIG. 11 represents an example of a video encoder configured to generate syntax for an encoded video bitstream. Encoding device 1104 may, for example, generate VPS, SPS, and PPS parameter sets as described above. The encoding device 1104 may perform any of the techniques described herein, including the processes described above with respect to FIG. 11 and FIG. 12. The techniques of this disclosure have generally been described with respect to encoding device 1104, but as mentioned above, some of the techniques of this disclosure may also be implemented by post processing device 57.

FIG. 12 is a block diagram illustrating an example decoding device 1212. The decoding device 1212 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra-prediction processing unit 84. Decoding device 1212 may, in some examples, perform a decoding pass generally reciprocal to the encoding pass described with respect to encoding device 1104 from FIG. 11.

During the decoding process, decoding device 1212 receives an encoded video bitstream that represents video blocks of an encoded video slice and associated syntax elements sent by encoding device 1104. In some embodiments, the decoding device 1212 may receive the encoded video bitstream from the encoding device 1104. In some embodiments, the decoding device 1212 may receive the encoded video bitstream from a network entity 79, such as a server, a media-aware network element (MANE), a video editor/splicer, or other such device configured to implement one or more of the techniques described above. Network entity 79 may or may not include encoding device 1104. Some of the techniques described in this disclosure may be implemented by network entity 79 prior to network entity 79 transmitting the encoded video bitstream to decoding device 1212. In some video decoding systems, network entity 79 and decoding device 1212 may be parts of separate devices, while in other instances, the functionality described with respect to network entity 79 may be performed by the same device that comprises decoding device 1212.

The entropy decoding unit 80 of decoding device 1212 entropy decodes the bitstream to generate quantized coefficients, motion vectors, and other syntax elements. Entropy decoding unit 80 forwards the motion vectors and other syntax elements to prediction processing unit 81. Decoding device 1212 may receive the syntax elements at the video slice level and/or the video block level. Entropy decoding unit 80 may process and parse both fixed-length syntax elements and variable-length syntax elements in one or more parameter sets, such as VPS, SPS, and PPS sets.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 1212 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 1104 during encoding of the video blocks to calculate interpolated values for sub-integer pixels of reference blocks. In this case, motion compensation unit 82 may determine the interpolation filters used by encoding device 1104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 1104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 1212 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 12 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the present disclosure is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, perform one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodied in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from a source device to a destination device. In one example, a computer-readable medium may comprise a communication medium to enable a source device to transmit encoded video data directly to a destination device in real-time. The encoded video data may be modulated according to a communication standard, such as a wireless communication protocol, and transmitted to a destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, a system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source devices and destination devices are merely examples of such coding devices in which a source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if a video source is a video camera, a source device and a destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

What is claimed is:

1. A method for processing encoded video data, the method comprising:
   receiving a file associated with encoded video data, wherein the encoded video data is stored in the file according to a file format, wherein the encoded video data includes two or more layers, and wherein the two or more layers are stored in two or more tracks in the file;
   determining a first layer from among the two or more layers, wherein the first layer includes a first end-of-bitstream indicator, wherein the first layer is determined to be a highest layer, among the two or more layers, that includes an end-of-bitstream indicator;
   identifying a set of layers from among the two or more layers, wherein the set of layers includes one or more layers selected for inclusion in a reconstructed bitstream; and
   generating the reconstructed bitstream, wherein generating the reconstructed bitstream includes generating a plurality of access units, wherein the plurality of access units includes one or more samples from the set of layers, and wherein a last access unit in the reconstructed bitstream includes the first end-of-bitstream indicator.

2. The method of claim 1, further comprising:
   determining, during the generation of the plurality of access units, that the last access unit in the reconstructed bitstream does not include an end-of-bitstream indicator; and
   adding the first end-of-bitstream indicator to the last access unit in the reconstructed bitstream.

3. The method of claim 1, further comprising:
   identifying a second layer from among the set of layers, wherein the second layer is identified as a highest layer from among the set of layers, wherein the second layer is different from the first layer, and wherein the set of layers does not include the first layer;
   determining that the first layer is a higher layer than the second layer; and
   adding the first end-of-bitstream indicator to the last access unit in the reconstructed bitstream based on the first layer being a higher layer than the second layer.

4. The method of claim 1, further comprising:
   identifying a second layer from among the set of layers, wherein the second layer is identified as a highest layer from among the set of layers, wherein the second layer is different from the first layer and wherein the set of layers includes the first layer;
   determining that the second layer is a higher layer than the first layer; and
   moving the first end-of-bitstream indicator to the last access unit in the reconstructed bitstream based on the second layer being a higher layer than the first layer.

5. The method of claim 1, further comprising:
   determining that the last access unit in the reconstructed bitstream includes more than one end-of-bitstream indicator, wherein the more than one end-of-bitstream indicator includes the first end-of-bitstream indicator; and
   removing from the last access unit each end-of-bitstream indicator other than the first end-of-bitstream indicator.

6. The method of claim 1, wherein at least two layers from among the two or more layers each include an end-of-bitstream indicator.

7. The method of claim 1, further comprising:
   identifying the set of layers are selected based on the samples from layers in the set of layers being selected for display.

8. The method of claim 1, wherein the file format is derived from an International Standards Organization (ISO) base media file format.

9. An apparatus for processing encoded video, comprising:
   a memory configured to store a file, wherein the file includes encoded video data, wherein the encoded video data is stored in the file according to a file format, wherein the encoded video data includes two or more layers, and wherein the two or more layers are stored in two or more tracks in the file; and
   a processor configured to:
      determine a first layer from among the two or more layers, wherein the first layer includes a first end-of-bitstream indicator, wherein the first layer is determined to be a highest layer, among the two or more layers, that includes an end-of-bitstream indicator;
      identify a set of layers from among the two or more layers, wherein the set of layers includes one or more layers selected for inclusion in a reconstructed bitstream; and
      generate, during generation of the reconstructed bitstream, a plurality of access units, wherein the plurality of access units includes one or more samples from the set of layers, and wherein a last access unit in the reconstructed bitstream includes the first end-of-bitstream indicator.

10. The apparatus of claim 9, wherein the processor is further configured to:
   determine, during the generation of the plurality of access units, that the last access unit in the reconstructed bitstream does not include an end-of-bitstream indicator; and
   add the first end-of-bitstream indicator to the last access unit in the reconstructed bitstream.

11. The apparatus of claim 9, wherein the processor is further configured to:
   identify a second layer from among the set of layers, wherein the second layer is identified as a highest layer from among the set of layers, wherein the second layer is different from the first layer and wherein the set of layers does not include the first layer;
   determine that the first layer is a higher layer than the second layer; and
   add the first end-of-bitstream indicator to the last access unit in the reconstructed bitstream based on the first layer being a higher layer than the second layer.

12. The apparatus of claim 9, wherein the processor is further configured to:
   identify a second layer from among the set of layers, wherein the second layer is identified as a highest layer from among the set of layers and the second layer is different from the first layer and wherein the set of layers includes the first layer;
   determine that the second layer is a higher layer than the first layer; and
   move the first end-of-bitstream indicator to the last access unit in the reconstructed bitstream based on the second layer being a higher layer than the first layer.

13. The apparatus of claim 9, wherein the processor is further configured to:
   determine that the last access unit in the reconstructed bitstream includes more than one end-of-bitstream indicator, wherein the more than one end-of-bitstream indicators include the first end-of-bitstream indicator; and
   remove from the last access unit each end-of-bitstream indicator other than the first end-of-bitstream indicator.

14. The apparatus of claim 9, wherein at least two layers from among the two or more layers each include an end-of-bitstream indicator.

15. The apparatus of claim 9, wherein the set of layers are selected based on the samples from layers in the set of layers being selected for display.

16. The apparatus of claim 9, wherein the file format is derived from an ISO base media file format.

17. A non-transitory computer-readable medium having stored thereon instructions that, when executed by one or more processors, cause the one or more processors to:
   receive a file associated with encoded video data, wherein the encoded video data is stored in the file according to a file format, wherein the encoded video data includes two or more layers, and wherein the two or more layers are stored in two or more tracks in the file;
   determine a first layer from among the two or more layers, wherein the first layer includes an first end-of-bitstream indicator, wherein the first layer is determined to be a highest layer, among the two or more layers, that includes an end-of-bitstream indicator;
   identify a set of layers from among the two or more layers, wherein the set of layers includes one or more layers selected for inclusion in a reconstructed bitstream; and
   generate, during generation of the reconstructed bitstream, a plurality of access units, wherein the plurality of access units includes one or more samples from the set of layers, and wherein a last access unit in the reconstructed bitstream includes the first end-of-bitstream indicator.

18. The non-transitory computer-readable medium of claim 17, further comprising instructions that, when executed by the one or more processors, cause the one or more processors to:
   determine, during the generation of the plurality of access units, that the last access unit in the reconstructed bitstream does not include an end-of-bitstream indicator; and
   add the first end-of-bitstream indicator to the last access unit in the reconstructed bitstream.

19. The non-transitory computer-readable medium of claim 17, further comprising instructions that, when executed by the one or more processors, cause the one or more processors to:
   identify a second layer from among the set of layers, wherein the second layer is identified as a highest layer from among the set of layers, wherein the second layer is different from the first layer and wherein the set of layers does not include the first layer;
   determine that the first layer is a higher layer than the second layer; and
   add the first end-of-bitstream indicator to the last access unit in the reconstructed bitstream based on the first layer being a higher layer than the second layer.

20. The non-transitory computer-readable medium of claim 17, further comprising instructions that, when executed by the one or more processors, cause the one or more processors to:
   identify a second layer from among the set of layers, wherein the second layer is identified as a highest layer from among the set of layers, wherein the second layer is different from the first layer, and wherein the set of layers include the first layer;
   determine that the second layer is a higher layer than the first layer; and
   move the first end-of-bitstream indicator to the last access unit in the reconstructed bitstream based on the second layer being a higher layer than the first layer.

21. The non-transitory computer-readable medium of claim 17, further comprising instructions that, when executed by the one or more processors, cause the one or more processors to:
   determine that the last access unit in the reconstructed bitstream includes more than one end-of-bitstream indicator, wherein the more than one end-of-bitstream indicators include the first end-of-bitstream indicator; and
   removing from the last access unit each end-of-bitstream indicator other than the first end-of-bitstream indicator.

22. The non-transitory computer-readable medium of claim 17, wherein at least two layers from among the two or more layers each include an end-of-bitstream indicator.

23. The non-transitory computer-readable medium of claim 17, wherein the set of layers are selected based on the samples from layers in the set of layers being selected for display.

24. The non-transitory computer-readable medium of claim 17, wherein the file format is derived from an ISO base media file format.

25. An apparatus for processing encoded video data, comprising:
   means for receiving a file associated with encoded video data, wherein the encoded video data is stored in the file according to a file format, wherein the encoded video data includes two or more layers, and wherein the two or more layers are stored in two or more tracks in the file;

means for determining a first layer from among the two or more layers, wherein the first layer includes an first end-of-bitstream indicator, wherein the first layer is determined to be a highest layer, among the two or more layers, that includes an end-of-bitstream indicator;

means for identifying a set of layers from among the two or more layers, wherein the set of layers includes one or more layers selected for inclusion in a reconstructed bitstream; and means for generating a reconstructed bitstream, wherein the means for generating the reconstructed bitstream includes means for generating a plurality of access units, wherein the plurality of access units includes one or more samples from the set of layers, and wherein a last access unit in the reconstructed bitstream includes the first end-of-bitstream indicator.

26. The apparatus of claim 25, further comprising:

means for determining, during the generation of the plurality of access units, that the last access unit in the reconstructed bitstream does not include an end-of-bitstream indicator; and means for adding the first end-of-bitstream indicator to the last access unit in the reconstructed bitstream.

27. The apparatus of claim 25, further comprising:

means for identifying a second layer from among the set of layers, wherein the second layer is identified as a highest layer from among the set of layers, wherein the second layer is different from the first layer and wherein the set of layers does not include the first layer;

means for determining that the first layer is a higher layer than the second layer; and means for adding the first end-of-bitstream indicator to the last access unit in the reconstructed bitstream based on the first layer being a higher layer than the second layer.

28. The apparatus of claim 25, further comprising:

means for identifying a second layer from among the set of layers, wherein the second layer is identified as a highest layer from among the set of layers, wherein the second layer is different from the first layer, and wherein the set of layers include the first layer;

means for determining that the second layer is a higher layer than the first layer; and means for moving the first end-of-bitstream indicator to the last access unit in the reconstructed bitstream based on the second layer being a higher layer than the first layer.

29. The apparatus of claim 25, further comprising:

means for determining that the last access unit in the reconstructed bitstream includes more than one end-of-bitstream indicator, wherein the more than one end-of-bitstream indicator includes the first end-of-bitstream indicator; and means for removing from the last access unit each end-of-bitstream indicator other than the first end-of-bitstream indicator.

30. The apparatus of claim 25, wherein at least two layers from among the two or more layers each include an end-of-bitstream indicator.

31. The apparatus of claim 25, further comprising:

means for identifying the set of layers are selected based on the samples from layers in the set of layers being selected for display.

32. The apparatus of claim 25, wherein the file format is derived from an International Standards Organization (ISO) base media file format.

* * * * *